US012421041B2

(12) United States Patent
Nguyenquang et al.

(10) Patent No.: US 12,421,041 B2
(45) Date of Patent: Sep. 23, 2025

(54) CONVEYANCE SYSTEM AND CONVEYING METHOD

(71) Applicant: SHARP KABUSHIKI KAISHA, Sakai (JP)

(72) Inventors: Thinh Nguyenquang, Sakai (JP); Hiroshi Yamauchi, Sakai (JP); Akihiro Yamakawa, Sakai (JP); Masahiro Sakakibara, Sakai (JP); Takashi Iwamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 755 days.

(21) Appl. No.: 17/751,472

(22) Filed: May 23, 2022

(65) Prior Publication Data

US 2022/0380128 A1    Dec. 1, 2022

(30) Foreign Application Priority Data

May 26, 2021  (JP) ................................ 2021-088376
May 26, 2021  (JP) ................................ 2021-088377
Mar. 30, 2022  (JP) ................................ 2022-055546

(51) Int. Cl.
  *B65G 1/137*   (2006.01)
  *B65G 1/04*    (2006.01)
  (Continued)

(52) U.S. Cl.
  CPC ......... *B65G 1/1373* (2013.01); *B65G 1/0492* (2013.01); *B65G 1/065* (2013.01);
  (Continued)

(58) Field of Classification Search
  CPC .... B65G 1/1373; B65G 1/0492; G06Q 10/08; G08G 1/081; G08G 1/164
  See application file for complete search history.

(56) References Cited

U.S. PATENT DOCUMENTS

2018/0210458 A1*  7/2018  Chen .................... G05D 1/0217
2019/0361464 A1*  11/2019  Ahnell ................. G05D 1/0289

FOREIGN PATENT DOCUMENTS

CN  108180908 A  *  6/2018  ........... G01C 21/165
CN  111813101 A  *  10/2020  ............ G01C 21/20
JP  2005242489 A  *  9/2005

OTHER PUBLICATIONS

CN-111813101-A (Year: 2020).*
CN-108180908-A (Year: 2018).*
JP-2005242489-A (Year: 2005).*

* cited by examiner

*Primary Examiner* — Ernesto A Suarez
*Assistant Examiner* — Laurence R Brothers
(74) *Attorney, Agent, or Firm* — ScienBiziP, P.C.

(57) ABSTRACT

A conveyance system according to this disclosure includes a movement request acceptor which accepts a movement request to an automatic conveying device; and a section travel-route setter which sets a section travel route with a predetermined length constituting a part of a travel route from a current position of a first automatic conveying device to a destination position so that the section travel route of the first automatic conveying device does not overlap the section travel route set for another second automatic conveying device on the basis of the movement request accepted by the movement request acceptor, in which the section travel-route setter repeatedly executes processing of setting a second section travel route with an end position of a first section travel route as a start position of the subsequent second section travel route while the automatic conveying device is traveling on the first section travel route.

19 Claims, 17 Drawing Sheets

(51) Int. Cl.
    *B65G 1/06*          (2006.01)
    *G08G 1/081*       (2006.01)
    *G08G 1/16*         (2006.01)
    *G06Q 10/087*     (2023.01)

(52) U.S. Cl.
    CPC ............. *G08G 1/081* (2013.01); *G08G 1/164* (2013.01); *G06Q 10/087* (2013.01)

FIG. 4

| ITEM ID | ITEM NAME | SHELF ID |
|---|---|---|
| G1 | BREAD | T1 |
| G2 | INSTANT NOODLE | T2 |
| G3 | WATER | T3 |
| ... | ... | ... |

| UNIT ORDER ID | CUSTOMER ID | ORDERED ITEM | QUANTITY | ORDER TIME AND DATE |
|---|---|---|---|---|
| O1 | CUSTOM1 | ICE CREAM | 2 | ... |
| O2 | CUSTOM1 | ICE | 3 | ... |
| O3 | CUSTOM2 | BANANA | 5 | ... |
| O4 | CUSTOM2 | APPLE | 5 | ... |

| SET ORDER ID | UNIT ORDER ID | SHELF ID |
|---|---|---|
| SET1 | O1, O2, O3, O4 | T3 |
| SET2 | ... | ... |
| ... | ... | ... |

D3

CONVEYANCE SYSTEM AND CONVEYING METHOD

INCORPORATION BY REFERENCE

This application is based upon and claims the benefit of priority from the corresponding Japanese Patent Application No. 2021-088376 filed on May 26, 2021, Japanese Patent Application No. 2021-088377 filed on May 26, 2021, and Japanese Patent Application No. 2022-055546 filed on Mar. 30, 2022, the entire contents of which are incorporated herein by reference.

BACKGROUND

This disclosure relates to a conveyance system and a conveying method.

Conventionally, such a conveyance system in which an automatic conveying device receives items to be conveyed at a storage position (storage shelves, for example) and conveys them to a discharging position (delivery area) in a warehouse or the like are known.

For example, Japanese Patent Application Publication No 2005-242489 (hereinafter referred to as "Patent Document 1") discloses an operation control system in which, when loading and unloading areas of workpieces are instructed, a traveling plan including a route from the loading area to the unloading area is drafted, a relationship between the routes drafted by each autonomous moving body is evaluated, and if there is a possibility of interference between the routes of each autonomous moving body, instructions are given to the autonomous moving bodies to avoid the interference.

In the system described in Embodiment 1 of Patent Document 1, when a conveyance request is made from the centralized controller to an autonomous moving body on standby, the autonomous moving body searches for a route connecting instructed loading and unloading areas as a combination of unit routes, extracts the combination of units routes with the shortest distance and drafts a traveling plan. Moreover, when there are virtual obstacles set in the route that has been already adopted by another autonomous moving body in the traveling route of the drafted traveling plan, the automatic vehicle drafts a traveling plan again to avoid the virtual obstacles. Then, the autonomous moving body starts conveyance after the traveling plan is drafted to avoid the virtual obstacles.

In other words, the aforementioned system in Embodiment 1 is to draft a traveling plan that prevents interference with other autonomous moving bodies along the entire route to the loading and unloading areas before the autonomous moving body starts conveyance. Therefore, as the travel route becomes longer, it is necessary to predict interference with other autonomous moving bodies in the distant future, which causes problems of difficulty in prediction of interference or lowered prediction accuracy. In addition, virtual obstacles are set in order to prevent other autonomous moving bodies from entering over the long travel routes included in the traveling plans, which greatly impedes movement of other autonomous moving bodies and causes the problem of lowered operational efficiency.

In the system described in Embodiment 2 of Patent Document 1, the autonomous moving body starts conveyance without re-drafting the traveling plan to avoid virtual obstacles after the traveling plan is drafted in the same way as in Embodiment 1. Then, after the autonomous moving vehicle has started conveyance, the system constantly monitors the position of the autonomous moving body and gives instructions to the autonomous moving body from the centralized controller as necessary in order to avoid interference by the autonomous moving body.

In other words, the aforementioned system in Embodiment 2 drafts a traveling plan without considering interference with other autonomous moving bodies before the autonomous moving body starts conveyance, and when the autonomous moving body determines that interference with other autonomous moving bodies would occur during the conveyance, the aforementioned traveling plan is discarded and a new travel route is set up.

In addition, the aforementioned system in Embodiment 2 allows interference with other autonomous moving bodies at the time when the autonomous moving body's traveling plan is drafted, and when the autonomous moving body determines that interference with other autonomous moving bodies will occur during conveyance, the traveling plan drafted at the start of conveyance is discarded and a new travel route is set up and thus, a problem arises that traveling stops until the traveling plan is discarded and a new travel route is set up. In addition, a problem that a very large processing load arises since the position of each autonomous moving bodies should be constantly monitored to avoid interference among the autonomous moving bodies.

SUMMARY

The purpose of the present disclosure is to provide a conveyance system and a conveying method that can reduce a loss of conveyance time in the entire course on which the automatic conveying device travels.

The conveyance system according to one aspect of the present disclosure is a conveyance system that sets a travel route for the automatic conveying device and moves it to a destination position. The conveyance system includes a movement request acceptor and a section travel-route setter. The movement request acceptor accepts movement requests to the automatic conveying device. The section travel-route setter sets, on the basis of the movement request accepted by the movement request acceptor, a section travel route with a predetermined length that constitutes a part of a travel route from a current position of a first automatic conveying device to the destination position so that the section travel route of the first automatic conveying device does not overlap the section travel route set for another second automatic conveying device. In addition, the section travel-route setter repeatedly executes processing of setting a second section travel route with an end position of the first section travel route as a start position of the subsequent second section travel route while the automatic conveying device is traveling on the first section travel route.

A conveying method according to another aspect of the present disclosure is a conveying method in which one or a plurality of processors set a travel route for an automatic conveying device so as to move it to a destination position, executing accepting a movement request to the automatic conveying device, on the basis of the movement request, setting a section travel route with a predetermined length constituting a part of a travel route from a current position of the first automatic conveying device to the destination position so that the section travel route of the first automatic conveying device does not overlap the section travel route set for another second automatic conveying device, and repeatedly executing processing of setting a second section travel route with an end position of a first section travel route as a start position of the subsequent second section travel route while the automatic conveying device is traveling on the first section travel route.

According to this disclosure, the loss of conveyance time in the entire course in which the automatic conveying device travels can be reduced.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a table illustrating an example of item information used in the conveyance system according to the embodiment of the present disclosure.

FIG. 5 is a table illustrating an example of order information used in the conveyance system according to the embodiment of the present disclosure.

FIG. 6 is a table showing an example of set order information used in the conveyance system according to the embodiment of the present disclosure.

DETAILED DESCRIPTION

An embodiment of the present disclosure will be described below with reference to the accompanying drawings to facilitate understanding of the present disclosure. Note that the following embodiment is an example in which the present disclosure is embodied, and does not limit the technical scope of the present disclosure.

Conveyance System 10

Figure 1:
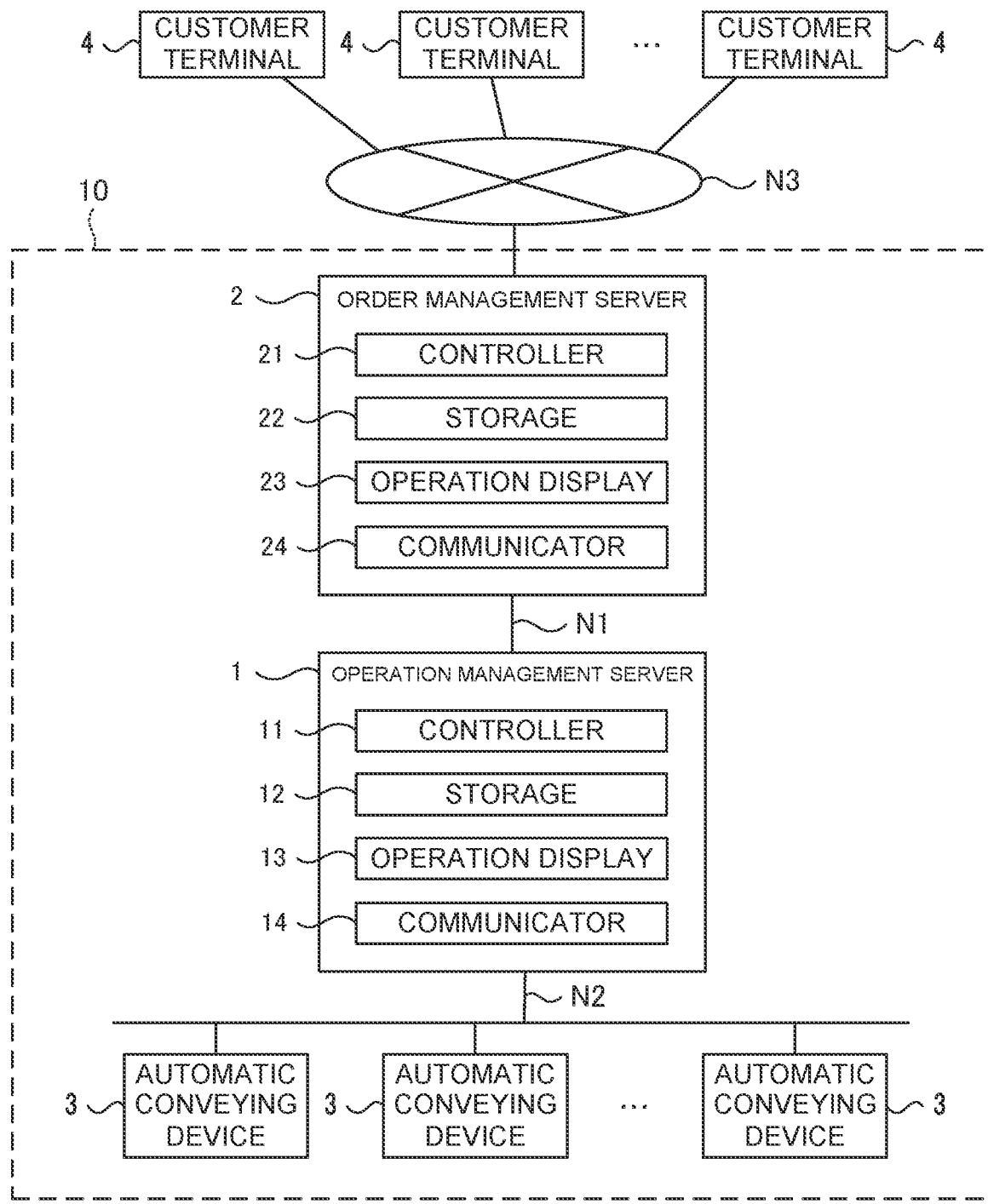
FIG. 1 is a block diagram illustrating a configuration of a conveyance system according to an embodiment of the present disclosure.

As shown in FIG. 1, the conveyance system 10 according to the embodiment of the present disclosure includes an operation management server 1, an order management server 2, and automatic conveying device 3 (also referred to as AGVs or unmanned conveying devices). The operation management server 1 and the order management server 2 can communicate with each other via a communication network N1, such as a wired LAN or a wireless LAN. Moreover, the operation management server 1 and the automatic conveying device 3 can communicate with each other via a communication network N2, such as a wireless LAN. Furthermore, the order management server 2 can communicate with customer terminals 4 via a communication network N3, such as the Internet.

The conveyance system 10 is a system in which a plurality of aisles are set up along which the automatic conveying device 3 can travel, and the aisle to be traveled in the plurality of aisles is specified for the automatic conveying device 3 as a travel route so that a conveyance target is conveyed from a storage position to a destination position. Specifically, the conveyance system 10 is applied to a warehouse (logistics warehouse) storing items (conveyance targets), for example. Upon accepting an order for an item from a customer (customer terminal 4), the conveyance system 10 outputs a conveyance instruction to the automatic conveying device 3. Upon obtaining the conveyance instruction, the automatic conveying device 3 moves to a storage position (storage shelf) of the item, receives the item from a worker, and conveys the item to a delivery area. The customer terminal 4 is an information processing device, such as a personal computer or a smartphone and the like, and a customer can access a web site (order page) operated by the order management server 2 using the customer terminal 4 so as to order an item, for example.

The order management server 2 can accept orders for items from each of the plurality of customer terminals 4, and integrates each piece of the accepted order information and outputs it to the operation management server 1. The operation management server 1 manages operations of each of the plurality of automatic conveying devices 3 and outputs conveyance instructions (traveling instructions) to each of the automatic conveying devices 3 on the basis of the order information. The automatic conveying device 3 autonomously travels along a preset travel route on the basis of the conveyance instruction, picks an item included in the order information from a storage shelf, and conveys the item to the delivery area. Note that the autonomous traveling method of the automatic conveying device 3 is not particularly limited, and known methods, such as a method using a magnetic tape installed on a floor surface and a marker that prescribes a traveling operation (control information), can be employed, for example.

Furthermore, on the automatic conveying device 3, a plurality of containers (containers), for example, are mounted, each of which accommodates customer's ordered items, so that a plurality of customers' items can be conveyed altogether by single picking traveling (traveling from a standby area to the delivery area through traveling among individual shelves). For example, when the automatic conveying device 3 has two containers mounted, the automatic conveying device 3 can convey the ordered items for two customers altogether. The operation management server 1 outputs the conveyance instruction corresponding to the order information of one or a plurality of customers to each of the automatic conveying devices 3.

Figure 3:
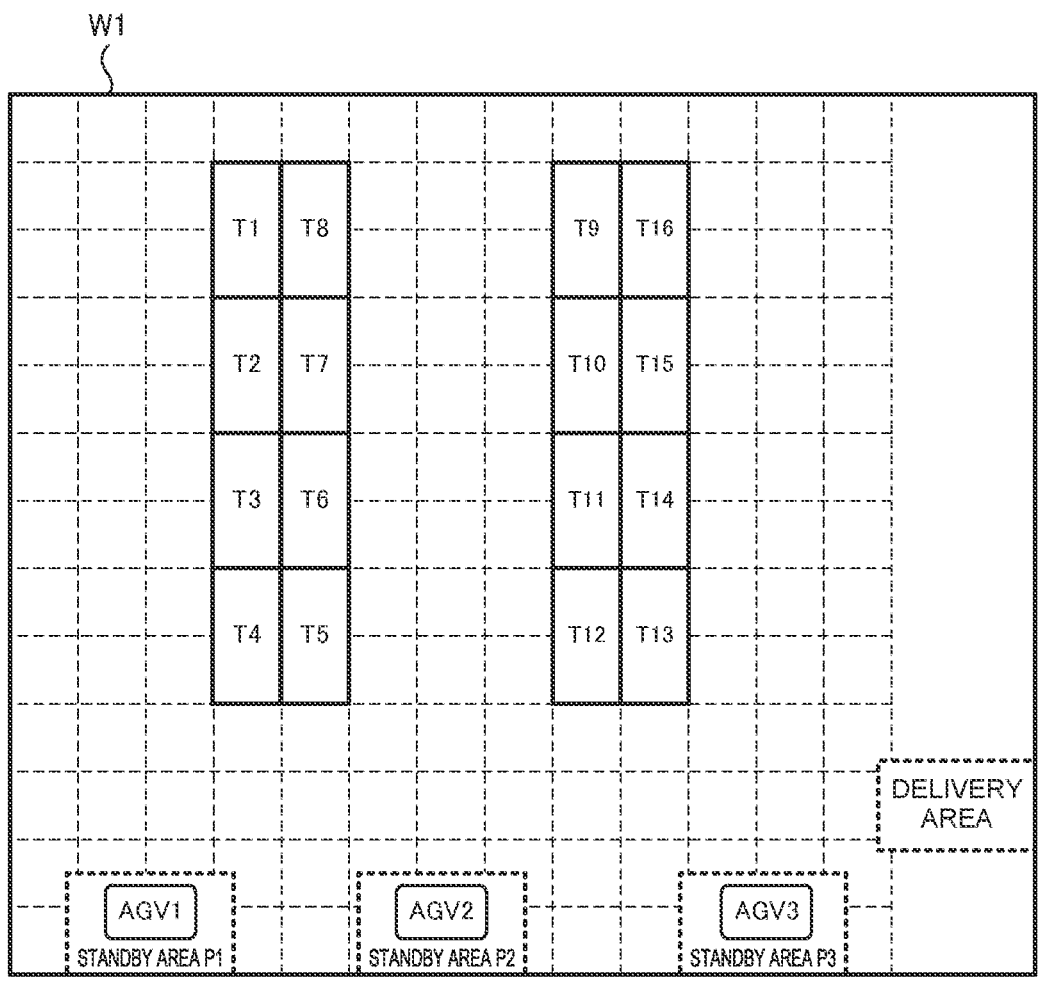
FIG. 3 is a diagram schematically illustrating a configuration of a warehouse to which the conveyance system according to the embodiment of the present disclosure is applied.

In this embodiment, a case where the conveyance system 10 is applied to a warehouse W1 shown in FIG. 3 will be described as an example. In the warehouse W1 shown in FIG. 3, a plurality of storage shelves (storage positions) for storing items (conveyance targets) are disposed. FIG. 3 exemplifies 16 storage shelves T1 to 16.

Moreover, in the warehouse W1, a standby area for the automatic conveying device 3 is set. For example, in the warehouse W1, a standby area P1 where an AGV1 stands by, a standby area P2 where an AGV2 stands by, and a standby area P3 where an AGV3 stands by are set. Each of the automatic conveying devices 3 stands by at a predetermined standby area if a conveyance instruction has not been received from the operation management server 1.

When each of the automatic conveying devices 3 obtains a conveyance instruction from the operation management server 1, it moves from the standby area to the storage shelf where the ordered item is stored. For example, when the AGV1 obtains the conveyance instruction including an item on the storage shelf T1 in the order information from the operation management server 1, it moves to the storage shelf T1 and receives the ordered item from the worker in charge of the picking operation and then, moves to the delivery area in accordance with the preset travel route.

In this embodiment, the conveyance system 10 corresponds to a conveyance system according to the present disclosure, but the conveyance system according to the present disclosure may be constituted only by the single operation management server 1 or may include one or a plurality of the operation management servers 1, the order management servers 2, and the automatic conveying devices 3.

Order Management Server 2

As shown in FIG. 1, the order management server 2 is a server which includes a controller 21, a storage 22, an operation display 23, a communicator 24 and the like. Note that the order management server 2 is not limited to a single computer, but may be a computer system including a plurality of computers operating cooperatively. In addition, various types of processing that are executed by the order management server 2 may be executed by one or a plurality of processors in a distributed manner.

The communicator 24 is a communication interface that connects the order management server 2 to the communication network N1 in a wired or wireless manner so as to execute data communication in accordance with a predetermined communication protocol with the operation management server 1 via the communication network N1. Furthermore, the communicator 24 is a communication interface that connects the order management server 2 to the communication network N3 in a wired or wireless manner so as to execute data communication in accordance with a predetermined communication protocol with one or a plurality of the customer terminals 4 via the communication network N3.

The operation display 23 is a user interface including a display, such as a liquid-crystal display or an organic EL display, that displays various types of information, and an operation acceptor, such as a mouse, a keyboard, or a touch panel that receives operations.

The storage 22 is a non-volatile storage, such as a hard disk drive (HDD) or a solid state drive (SSD), that stores various types of information. Specifically, the storage 22 stores data, such as item information D1 and order information D2. The item information D1 includes information about the items stored in the warehouse. The order information D2 includes information about a customer's order. FIG. 4 is a diagram illustrating an example of the item information D1, and FIG. 5 is a diagram illustrating an example of the order information D2.

As shown in FIG. 4, the item information D1 includes, for each item, corresponding information such as "item ID," "item name," "shelf ID" and the like. The item ID is identification information of an item, and the item name is a name of the item. The shelf ID is identification information of a storage shelf where the item is stored. In this embodiment, as the shelf IDs, for example, "T1" indicating the storage shelf T1, "T2" indicating the storage shelf T2, "T3" indicating the storage shelf T3 and the like are registered.

The item information D1 is stored in the storage 22 in advance by a registration operation performed by a warehouse administrator, for example. Moreover, the administrator can update the item information D1 as appropriate. Furthermore, the item information D1 may also be registered in the operation management server 1.

As shown in FIG. 5, the order Information D2 includes, for each order, corresponding information such as "unit order ID", "customer ID", "ordered item", "quantity", "order time and date" and the like. The unit order ID is identification information of an order, and the customer ID is identification information of a customer who ordered the item. The ordered item is a name of the item ordered by the customer, and the quantity is the number of ordered items. The order time and date is information on the time and date when the order was accepted from the customer.

The order information D2 is registered by the controller 21 every time the order management server 2 accepts an order from the customer terminal 4.

Note that, as another embodiment, a part or all of the item information D1 and the order information D2 may be stored in another server accessible from the order management server 2 via the communication network N3.

In addition, the storage 22 stores control programs, such as a conveyance program for causing the controller 21 to execute the conveyance processing (see FIG. 18 and FIG. 19) described below. For example, the conveyance program is recorded non-temporarily in a computer-readable recording medium, such as a CD or a DVD, is read by a reading device (not shown), such as a CD drive or a DVD drive, included in the order management server 2, and is stored in the storage 22.

The controller 21 has control devices, such as a CPU, a ROM, a RAM and the like. The CPU is a processor that executes various types of calculation processing. The ROM is a non-volatile storage that stores, in advance, control programs such as BIOS and OS to cause the CPU to execute various types of calculation processing. The RAM is a volatile or non-volatile storage that stores various types of information, and is used as temporary storage memory (working area) for various types of processing that are executed by the CPU. The controller 21 controls the order management server 2 by causing the CPU to execute the various types of control programs stored in advance in the ROM or the storage 22.

Specifically, the controller 21 accepts an order of an item from the customer terminal 4. When the controller 21 accepts an order from the customer terminal 4, the controller 21 registers contents of the order in the order information D2. Moreover, the controller 21 outputs the order information D2 to the operation management server 1. For example, the controller 21 outputs, to the operation management server 1, the order information D2 (see FIG. 5) integrating a plurality of orders accepted in a predetermined period of time. In this way, the controller 21 outputs the order information D2 to the operation management server 1 with a predetermined cycle.

As another embodiment, the controller 21 may output the order information D2 to the operation management server 1 when it accepts an output request for the order information D2 from the operation management server 1. For example, the operation management server 1 may output an output request for the order information D2 to the order management server 2 on the basis of an operation status of the automatic conveying device 3.

Moreover, when the controller 21 outputs the order information D2 to the operation management server 1, the controller 21 may delete the order information D2 from the storage 22.

Operation Management Server 1

As shown in FIG. 1, the operation management server 1 is a server including a controller 11, a storage 12, an operation display 13, a communicator 14 and the like. Note that the operation management server 1 is not limited to a single computer, but may be a computer system including a plurality of computers operating cooperatively. Moreover, various types of processing executed by the operation management server 1 may be executed by one or a plurality of processors in a distributed manner.

The communicator 14 is a communication interface that connects the operation management server 1 to the communication network N1 in a wired or wireless manner so as to execute data communication in accordance with a predetermined communication protocol with the order management server 2 via the communication network N1. Furthermore, the communicator 14 is a communication interface that connects the operation management server 1 to the communication network N2 in a wired or wireless manner so as to execute data communication in accordance with a predetermined communication protocol with one or a plurality of automatic conveying devices 3 via the communication network N2.

The operation display 13 is a user interface including a display, such as a liquid crystal display or an organic EL display, that displays various types of information, and an operation acceptor, such as a mouse, a keyboard, or a touch panel that accepts operations.

The storage 12 is a non-volatile storage, such as an HDD or an SSD, storing various types of information. Specifically, the storage 12 stores data, such as set order information D3. The set order information D3 includes information about a set order combining unit orders. FIG. 5 is a diagram illustrating an example of the set order information D3.

As shown in FIG. 5, the set order information D3 includes information, for each set order combining the unit orders, such as the corresponding "set order ID", "unit order ID", "shelf ID" and the like. The set order ID is identification information of a set order combining unit orders. The controller 11 generates a set order by combining unit orders on the basis of information such as a storage position of the item, a current position of the automatic conveying device 3, operation rules and the like.

The set order information D3 is included in the conveyance instruction sent to the automatic conveying device 3. For example, if the AGV1 obtains a conveyance instruction including the set order information D3 of "SET1", the AGV1 moves to the position with the shelf ID "T3" included in the set order information D3. AGV1 then receives items of each of the unit order IDs "O1", "O2", "O3", and "O4" from the worker.

When the controller 11 obtains the order information D2 (see FIG. 5) from the order management server 2, the controller 11 generates the set order information D3 (see FIG. 6) with reference to the item information D1 (see FIG. 4).

Note that, as another embodiment, a part or all of the order information D2 and the set order information D3 may be stored in another server accessible from the operation management server 1 via the communication network N1. In this case, the controller 11 of the operation management server 1 may obtain the information from the another server and execute each processing, such as conveyance processing described below (see FIG. 18 and FIG. 19).

In addition, the storage 12 stores control programs, such as a conveyance program for causing the controller 11 to execute the conveyance processing (see FIG. 18 and FIG. 19) described below. For example, the conveyance program is non-temporarily recorded in a computer-readable recording medium, such as a CD or a DVD, is read by a reading device (not shown), such as a CD drive or a DVD drive, included in the operation management server 1, and is stored in the storage 12.

The controller 11 includes control devices, such as a CPU, a ROM, and a RAM. The CPU is a processor that executes various types of calculation processing. The ROM is a non-volatile storage that stores, in advance, control programs such as BIOS and OS to cause the CPU to execute various types of calculation processing. The RAM is a volatile or non-volatile storage that stores various types of information, and is used as temporary storage memory (working area) for various types of processing that are executed by the CPU. Then, the controller 11 controls the operation management server 1 by causing the CPU to execute the various types of control programs stored in advance in the ROM or the storage 12.

By the way, the conventional system assigns a route to each autonomous moving body when the autonomous moving body ends traveling on each unit route so as to avoid interference with a route previously adopted by another autonomous moving body. Specifically, if the system adopts a route for one autonomous moving body first, it prohibits other autonomous moving bodies from entering the route by setting virtual obstacles on the route. According to this configuration, when the assigned route is long, the entry of other autonomous moving bodies is extensively excluded, and a frequency of re-setting the course so that other autonomous moving bodies bypass it increases, whereby a loss due to intersection is increased. On the other hand, if the assigned route is short, a highest speed that can be set is lowered because a distance for acceleration and a distance for deceleration are shorter on that route. Since the system in Patent Literature 1 does not take these problems into account, a problem of occurrence of a loss in conveyance time is generated.

In addition, when a traveling plan is to be redrafted, the conventional system extracts a route which is the second shortest route to the first one. However, no assessment was made as to whether the conveyance time for the re-drafted route is actually the shortest. For example, as a result of avoiding interference with autonomous moving bodies for which the route has been set first, interference with other autonomous moving bodies may increase, which could lead to a problem that entire conveyance time for the autonomous moving body becomes longer.

In contrast, the conveyance system 10 according to this embodiment can reduce the loss of conveyance time in the entire course over which the automatic conveying device travels, as shown below.

Figure 2:
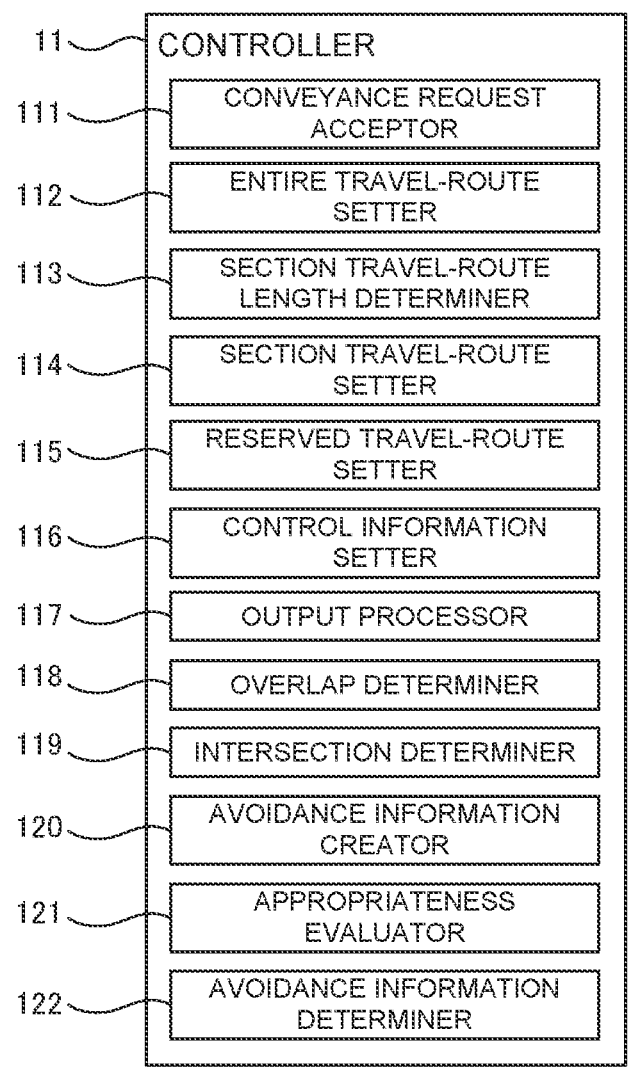
FIG. 2 is a block diagram illustrating a configuration of an operation management server according to the embodiment of the present disclosure.

Specifically, as shown in FIG. 2, the controller 11 includes various types of processors such as a conveyance request acceptor 111, an entire travel-route setter 112, a section travel-route length determiner 113, a section travel-route setter 114, a reserved travel-route setter 115, a control information setter 116, an output processor 117, an overlap determiner 118, an intersection determiner 119, an avoidance information creator 120, an appropriateness evaluator 121, an avoidance information determiner 122 and the like. Note that the controller 11 functions as the various types of processors by executing various types of processing in accordance with the conveyance program by the CPU. Moreover, a part or all of the processors may be configured by an electronic circuit. Note that the conveyance program may be a program which causes a plurality of processors to function as the processor described above.

The conveyance request acceptor 111 accepts a conveyance request (picking order) for items (conveyance targets). Note that the conveyance request is an example of a movement request in this disclosure. Specifically, the conveyance request acceptor 111 accepts the order information D2 corresponding to a plurality of customer orders from the order management server 2. For example, the conveyance request acceptor 111 accepts the order information D2 (see FIG. 5) including orders of the customers CUSTOM1 and CUSTOM2. The conveyance request acceptor 111 is an example of the movement request acceptor of the present disclosure.

The controller 11 generates the set order information D3 on the basis of the order information D2. For example, when the conveyance request acceptor 111 accepts the order information D2 (see FIG. 5) including four orders (unit orders) of the customers CUSTOM1 and CUSTOM2, the controller 11 generates the set order information D3 of "SET1" (see FIG. 6) by referring to the item information D1 (see FIG. 4). For example, the controller 11 generates the set order information D3 by aggregating multiple items included in the order information D2 that are stored in the same area into a single order (set order). Moreover, the controller 11 generates the set order information D3, which is assigned to each of the plurality of containers mounted on the automatic conveying device 3.

The entire travel-route setter 112 sets the entire travel route from the current position of the automatic conveying device 3 to the storage position (storage shelf) on the basis of the conveyance request accepted by the conveyance request acceptor 111.

Here, the controller 11 obtains the current positions of all the automatic conveying devices 3. Each automatic conveying device 3 transmits information such as a current position, a traveling speed, an advancing direction, a travel status (during traveling or waiting) and the like to the operation management server 1 on a real time basis. On the basis of the aforementioned information transmitted from each automatic conveying device 3, the controller 11 specifies one automatic conveying device 3 and assigns the set order information D3.

Figure 7:
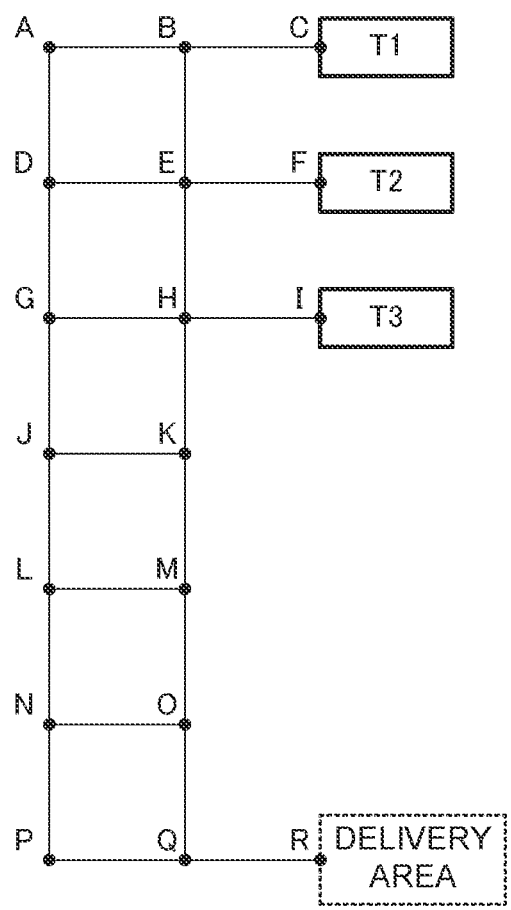
FIG. 7 is a diagram schematically illustrating some areas of the warehouse according to the embodiment of the present disclosure.
Figure 8:
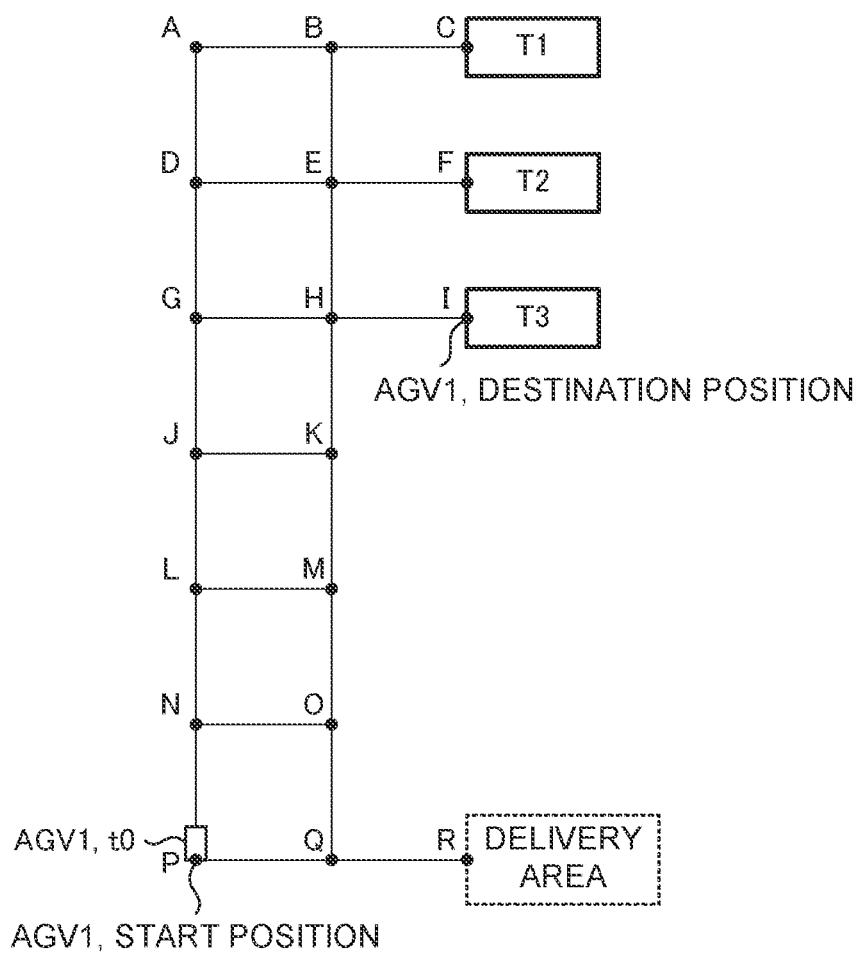
FIG. 8 is a diagram illustrating an example of a setting method of travel route in the conveyance system according to the embodiment of the present disclosure.

The entire travel-route setter 112 sets a travel start position and a destination position for the assigned automatic conveying device 3. FIG. 7 schematically illustrates a part of an area of the warehouse W1. Signs A to R indicate points in the warehouse W1, and straight lines connecting each point indicate aisles along which the automatic conveying device 3 can travel. For example, if the controller 11 assigns the set order information D3 of "SET1" to the AGV1, as shown in FIG. 8, the entire travel-route setter 112 sets a point P as the travel start position of the AGV1 and sets a point I as the destination position.

When the entire travel-route setter 112 sets the travel start position and the destination position for the AGV1, it sets the entire travel route, which is an initial travel route. Specifically, the entire travel-route setter 112 performs operation simulations of all the automatic conveying devices 3 and sets the entire travel route and control information with which a total of conveyance time of all the automatic conveying devices 3 becomes the shortest.

Figure 9:
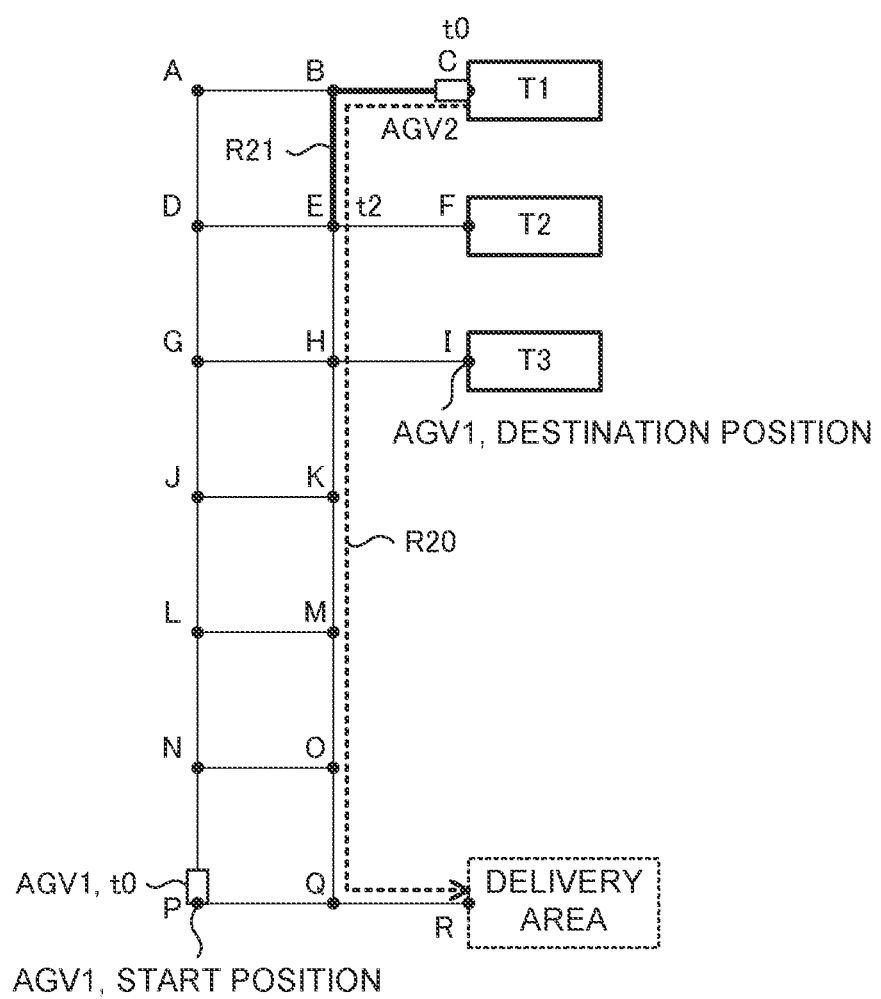
FIG. 9 is a diagram illustrating an example of the setting method of the travel route in the conveyance system according to the embodiment of the present disclosure.

For example, the entire travel-route setter 112 first observes the travel status (current position, traveling speed, reserved travel route, and estimated arrival time for the reserved travel route) of the other automatic conveying devices 3 (here, AGV2, AGV3). For example, as shown in FIG. 9, the AGV2 is moving from a point C of the storage shelf T1 to a point R of the delivery area, an aisle of the points C→B→E is set as the reserved travel route, and the estimated arrival time at point E is t2. In this case, the entire travel-route setter 112 prohibits entry by the AGV1 into a section of the aisle of the points C→B→E from time t0 to t2.

Figure 10:
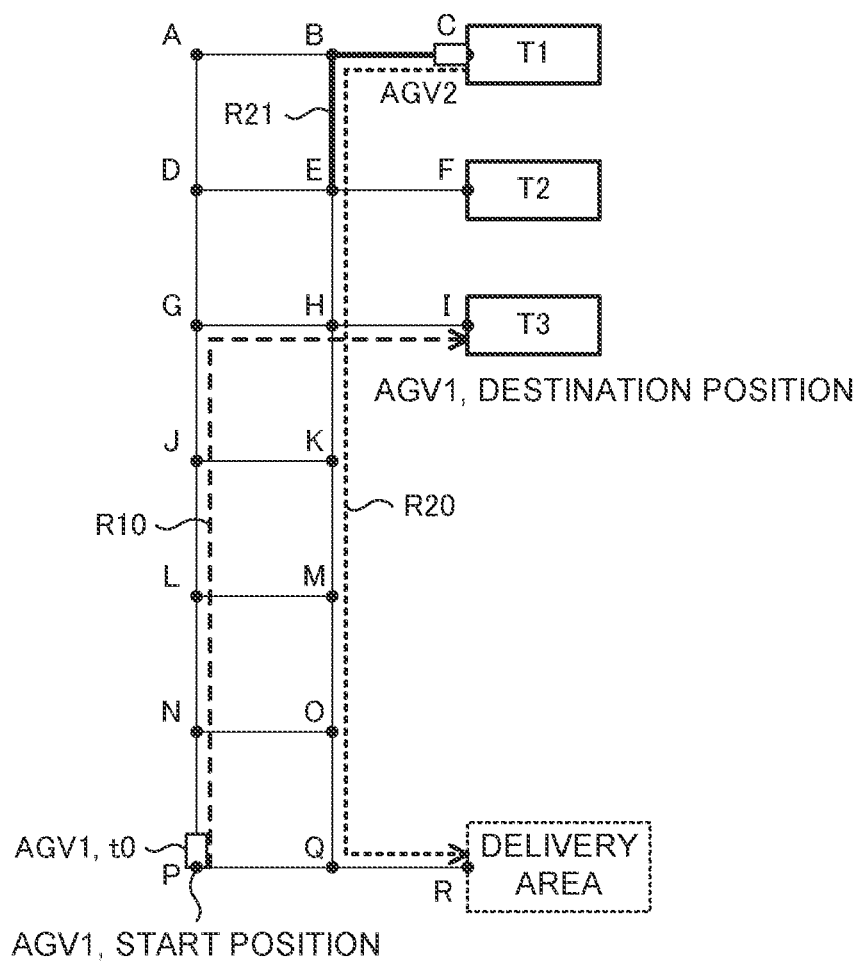
FIG. 10 is a diagram illustrating an example of the setting method of the travel route in the conveyance system according to the embodiment of the present disclosure.

Subsequently, the entire travel-route setter 112 performs the operation simulations for all the automatic conveying devices 3 at the same time, and while prohibiting the entry by the AGV1 into the section of the aisle of the points C→B→E from the time t0 to t2, sets the entire travel route for the AGV1 to move from the point P to the point I so that the total of the conveyance time of all the AGVs becomes the shortest. Here, as shown in FIG. 10, the entire travel-route setter 112 sets the aisle of the points P→N→L→J→G→H→I as an entire travel route R10 (initial travel route) for the AGV1. Note that R20 in FIG. 10 illustrates the entire travel route (initial travel route) set for the AGV2.

The section travel-route length determiner 113 determines a length of the section travel route (reserved travel route) on the basis of information on a portion within a determined length set in advance from the section start position in the entire travel route set by the entire travel-route setter 112. There can be a plurality of methods for determining the length of the section travel route shown below (first to fifth determination methods), and the section travel-route length determiner 113 can adopt any of the methods.

First Determination Method

In the first determination method, a position of specific intersection with high possibility of intersection of a plurality of automatic conveying devices 3 among a plurality of intersections where a plurality of aisles intersect each other is registered in advance. Then, when there is no specific intersection in the portion within the determined length from the section start position in the entire travel route set by the entire travel-route setter 112, the section travel-route length determiner 113 sets a first length as a section travel-route length, and when there is the specific intersection within the determined length from the section start position, the section travel-route length determiner 113 sets a second length, which is shorter than the first length, as the section travel-route length.

Figure 11:
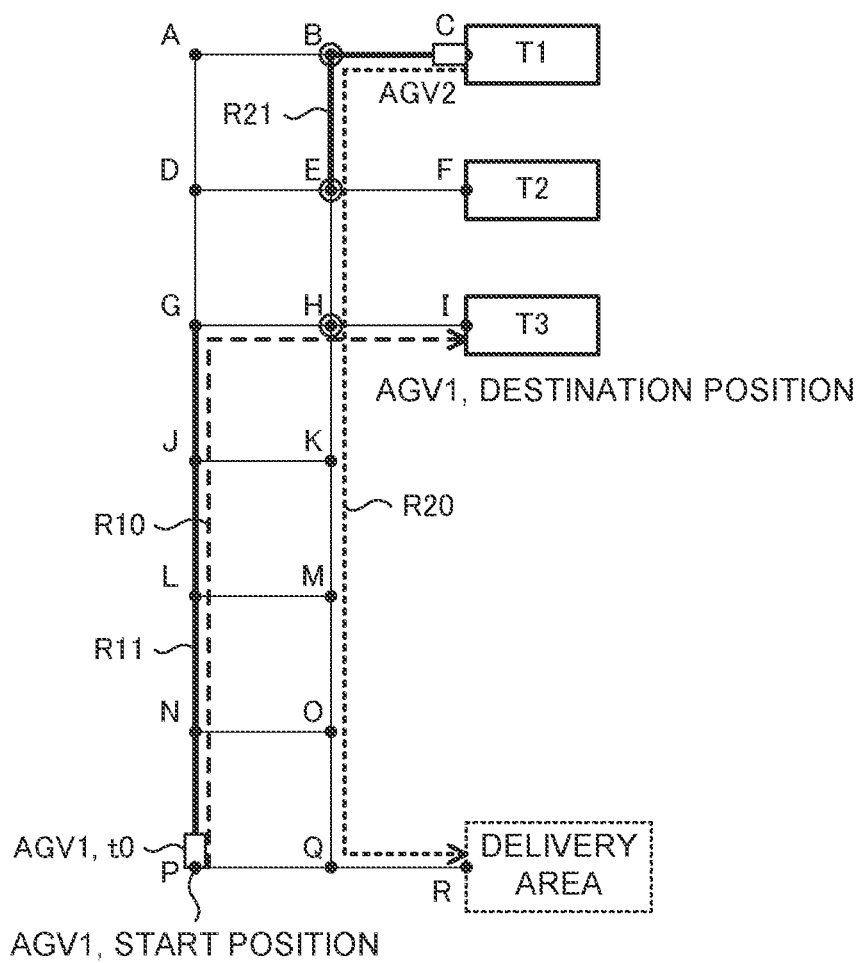
FIG. 11 is a diagram illustrating an example of the setting method of the travel route in the conveyance system according to the embodiment of the present disclosure.

For example, as shown in FIG. 11, it is assumed that points B, E, and H, which are merging points from storage shelves T1, T2, and T3 are registered as specific intersection. The section travel-route length determiner 113 determines, for the entire travel route R10, whether or not the specific intersection exists within four sections (the section up to a marker position four sections ahead) from the current position. Note that the length of the four sections from the current position is an example of the determined length. When the specific intersection does not exist within four sections from the current position, the section travel-route length determiner 113 sets the section travel-route length to "4" (the first length). Moreover, when the specific intersection exists within four sections from the current position, the section travel-route length determiner 113 sets the section travel-route length to "2" (the second length). In the example shown in FIG. 11, since the specific intersection does not exist within four sections from the current position P of the AGV1, the section travel-route length determiner 113 sets the length from the current position P to the point G four sections ahead (the section travel-route length "4") (the first length). The controller 11 predicts time until the AGV1 arrives at the point G by the operation simulation and prohibits the entry of the other AGVs until then.

Second Determination Method

In the second determination method, in a plurality of aisles, a high-speed travel aisle for high-speed travel of the automatic conveying device 3 and a low-speed travel aisle for low-speed travel of the automatic conveying device 3 are registered in advance. Then, when the low-speed travel isle is not included in the portion within the determined length from the section start position in the entire travel route set by the entire travel-route setter 112, the section travel-route length determiner 113 sets the first length as the section travel-route length, and when the low-speed travel isle is included in the portion within the determined length from the section start position, the section travel-route length determiner 113 sets the second length, which is shorter than the first length, as the section travel-route length.

Figure 12:
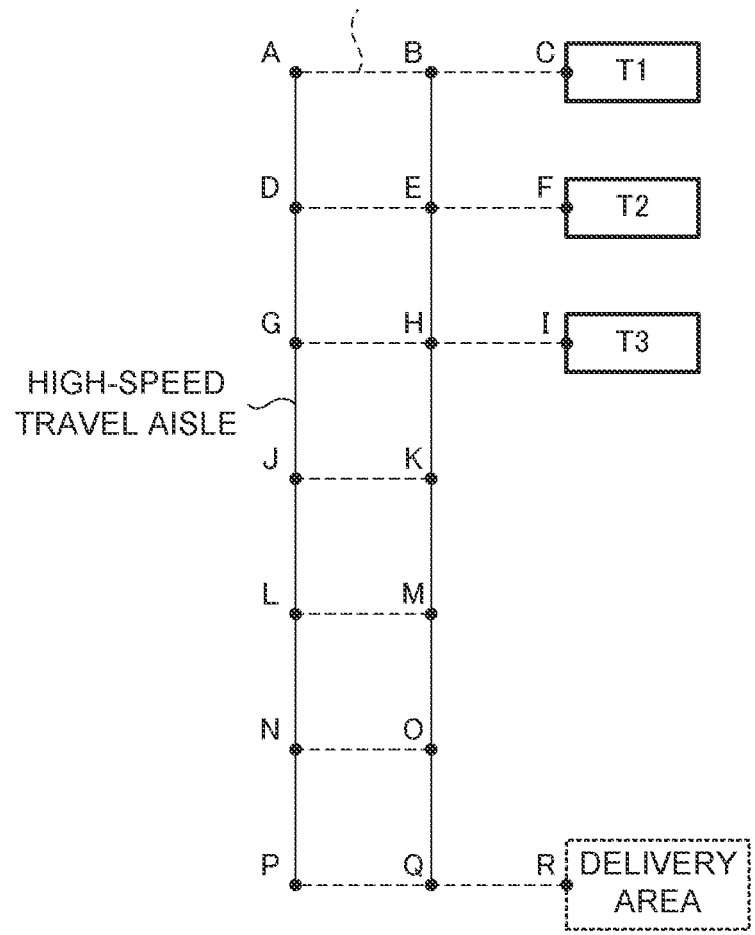
FIG. 12 is a diagram illustrating an example of the setting method of the travel route in the conveyance system according to the embodiment of the present disclosure.

For example, as shown in FIG. 12, vertical aisles (an aisle from the points A to P and an aisle from the points B to Q) are registered as the high-speed travel aisles, and lateral aisles (an aisle from the points A to C, an aisle from the points D to F, an aisle from the points G to I, an aisle from the points J to K, an aisle from the points L to M, an aisle from the points N to O, and an aisle from the points P to R) are registered as low-speed travel aisles. When the low-speed travel aisle is not included within four sections from the current position, the section travel-route length determiner 113 sets the section travel-route length to "4" (the first length). Moreover, when the low-speed travel aisle is included within four sections from the current position, the section travel-route length determiner 113 sets the section travel-route length to "2" (the second length). In the example shown in FIG. 11, since the low-speed travel aisle is not included within four sections from the current position P of the AGV1, the section travel-route length determiner 113 sets the length from the current position P to the point G four sections ahead (the section travel-route length "4") (the first length).

Third Determination Method

In the third determination method, a high-speed travel area for high speed travel of the automatic conveying device 3 and a low-speed travel area for low speed travel of the automatic conveying device 3 are registered in advance. Then, when the portion within the determined length from the section start position in the entire travel route set by the entire travel-route setter 112 is not included in the low-speed travel area, the section travel-route length determiner 113 sets the first length as the section travel-route length, and when there is the portion within the determined length from the section start position is included in the low-speed travel area, the section travel-route length determiner 113 sets the second length, which is shorter than the first length, as the section travel-route length.

Figure 13:
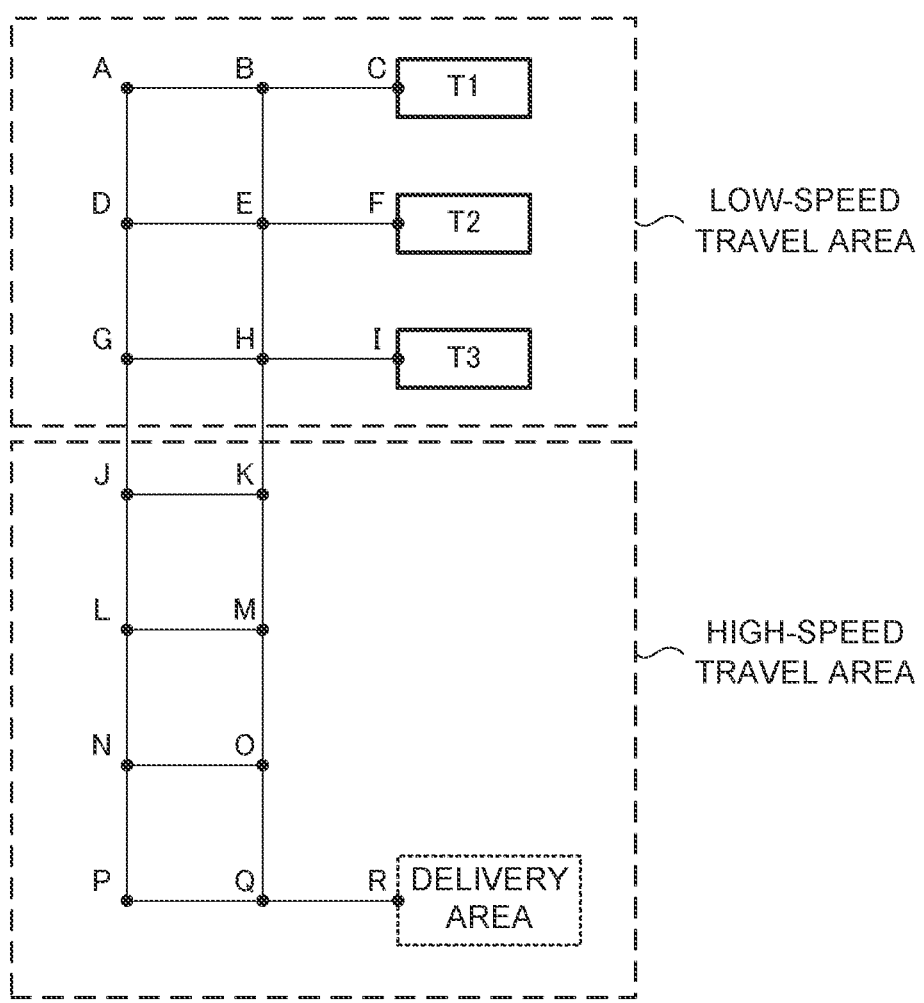
FIG. 13 is a diagram illustrating an example of the setting method of the travel route in the conveyance system according to the embodiment of the present disclosure.

For example, as shown in FIG. 13, the aisles from the points A to I are registered as the low-speed travel area, and the aisles from the points J to R are registered as the high-speed travel area. When the portion within four sections from the current position is not included in the low-speed travel area, the section travel-route length determiner 113 sets the section travel-route length to "4" (the first length). Moreover, when the portion within four sections from the current position is included in the low-speed travel area, the section travel-route length determiner 113 sets the section travel-route length to "2" (the second length). In the example shown in FIG. 11, since the portion within four sections from the current position P of the AGV1 is not included in the low-speed travel area, the section travel-route length determiner 113 sets the length from the current position P to the point G four sections ahead (the section travel-route length "4") (the first length).

Fourth Determination Method

In the fourth determination method, when there is no right/left turn point in the portion within the determined length from the section start position in the entire travel route set by the entire travel-route setter 112, the section travel-route length determiner 113 sets the first length as the section travel-route length, and when there is a right/left turn point in the portion within the determined length from the section start position, the section travel-route length determiner 113 sets the second length, which is shorter than the first length, as the section travel-route length.

In the example shown in FIG. 11, the portion within four sections from the current position P is a straight-line route and there is no right/left turn point in the portion and thus, the section travel-route length determiner 113 sets the length from the current position P of the AGV1 to the point G four sections ahead (the section travel-route length "4") (the first length).

Fifth Determination Method

In the fifth determination method, the section travel-route length determiner 113 determines a high-density area where the probability of occurrence of intersection is higher than a threshold value on the basis of the current positions of all the automatic conveying devices 3. Then, when the portion within the determined length from the section start position is not included in the high-density area in the entire travel route set by the entire travel-route setter 112, the section travel-route length determiner 113 sets the first length as the section travel-route length, and when the portion within the determined length from the section start position is included in the high-density area, the section travel-route length determiner 113 sets the second length, which is shorter than the first length, as the section travel-route length.

For example, if the area including the aisles from the points A to I is the high-density area and the area including the aisles from the points J to R is a low-density area, then since the area four sections away from the current position P of the AGV1 is the low-density area, the section travel-route length determiner 113 sets the length from the current position P of the AGV1 to the point G four sections ahead (the section travel-route length "4") (the first length).

Using any one of the aforementioned methods, the section travel-route length determiner 113 determines the length of the section travel route (section travel-route length).

The section travel-route setter 114 sets, on the entire travel route, a section travel route with the section travel-route length determined by the section travel-route length determiner 113 from the section start position. In the example shown in FIG. 11, the section travel-route setter 114 sets a route (aisle of the points P→N→L→J→G) with the length from the current position P to the point G four sections ahead (the section travel-route length "4") as a section travel route R11 in the entire travel route R10 corresponding to the AGV1. In addition, the section travel-route setter 114 sets a route (aisles of the points C→B→E) with the length from the current position C to the point E two sections ahead (the section travel-route length "2") as a section travel route R21 in the entire travel route R20 corresponding to the AGV2.

The reserved travel-route setter 115 sets the section travel route set by the section travel-route setter 114 as a reserved travel route. In the example shown in FIG. 11, the reserved travel-route setter 115 sets the section travel route R11 of the points P→N→L→J→G corresponding to the AGV1 as the reserved travel route. In addition, the reserved travel-route setter 115 sets the section travel route R21 of the points C→B→E corresponding to the AGV2 as the reserved travel route.

The control information setter 116 sets the control information that defines an operation of the automatic conveying device 3 in association with the markers on the section travel route.

Specifically, the control information setter 116 sets control information including information that specifies an advancing direction at each marker position toward the next marker position (straight ahead, left turn, right turn or the like) and information such as a traveling speed, acceleration, stop, turn and the like at each marker position. For example, the control information setter 116 sets the information of the first speed in association with the marker on the section travel route set by the section travel-route setter 114, when the section travel-route length is longer than the predetermined reference length and sets the information of the second speed, which is slower than the first speed, when the section travel-route length is less than the predetermined reference length. The reference length may be the same as the determined length. For example, the control information setter 116 sets the control information in which the traveling speed is set to a high speed for the reserved travel route of the section travel route R11 corresponding to the AGV1. On the other hand, the control information setter 116 sets the control information in which the traveling speed is set to a low speed for the reserved travel route of the section travel route R21 corresponding to the AGV2.

The output processor 117 outputs the travel route information including the entire travel route and the section travel route and the control information to the automatic conveying device 3. Here, the output processor 117 outputs the travel route information and the control information to each of the AGV1 and the AGV2. Upon obtaining the travel route information and the control information, each of the AGV1 and the AGV2 starts traveling on the reserved travel route.

When the automatic conveying device 3 starts traveling on the reserved travel route, the controller 11 sets the reserved travel route for the automatic conveying device 3 to travel next. Specifically, the controller 11 executes the following processing.

For example, at a first point of time when the AGV1 is traveling on the section travel route R11 in the entire travel route R10, the section travel-route length determiner 113 sets an end point (point G) of the section travel route R11 to the section start position of the section travel route R12 subsequent to the section travel route R11 and determines a second section route length, which is the section travel-route length of the section travel route R12 on the basis of the information on the portion within the determined length from the end point of the section travel route R11 in the entire travel route R10. In addition, the section travel-route setter 114 provisionally sets a route with the second section route length from the end point of the section travel route R11 on the entire travel route R10 as the section travel route R12.

In this case, the overlap determiner 118 determines whether the portion within the determined length from the end point (point G) of the section travel route R11 in the entire travel route R10 of the AGV1 overlaps the reserved travel route of the AGV2 or not. Then, when the overlap determiner 118 determines that the portion within the determined length from the end point (point G) of the section travel route R11 in the entire travel route R10 of the AGV1 does not overlap the reserved travel route of the AGV2, the section travel-route length determiner 113 determines the second section route length on the basis of the information on the portion within the determined length from the end point of the section travel route R11 in the entire travel route R10. In addition, the section travel-route setter 114 provisionally sets the section travel route R12 with the second section route length from the end point of the section travel route R11 on the entire travel route R10.

In addition, if the overlap determiner 118 determines that the portion within the determined length from the end point (point G) of the section travel route R11 in the entire travel route R10 of the AGV1 overlaps the reserved travel route of the AGV2, the entire travel-route setter 112 re-sets the entire travel route. The re-set entire travel route corresponds to the second entire travel route of the present disclosure. Then, after the entire travel route is re-set by the entire travel-route setter 112, the overlap determiner 118 further determines whether the portion within the determined length from the end point of the section travel route R11 in the re-set entire travel route R10 of the AGV1 overlaps the reserved travel route of AGV2 or not. When the overlap determiner 118 determines that the portion within the determined length from the end point of the section travel route R11 in the re-set entire travel route R10 of the AGV1 does not overlap the reserved travel route of the AGV2, the section travel-route length determiner 113 determines the second section route length on the basis of the information on the portion within the determined length from the end point of the section travel route R11 in the re-set entire travel route R10, and the section travel-route setter 114 sets the section travel route R12 with the second section travel-route length from the end point of the section travel route R11 on the re-set entire travel route R10.

In addition, if the overlap determiner 118 determines that the portion within the determined length from the end point of the section travel route R11 in the re-set entire travel route R10 of the AGV1 overlaps the reserved travel route of the AGV2, the entire travel-route setter 112 further re-sets the entire travel route. The re-set entire travel route corresponds to a third entire travel route of the present disclosure.

In addition, the intersection determiner 119 determines whether the AGV1 intersects the AGV2 on the entire travel route R10 or not.

Figure 14:
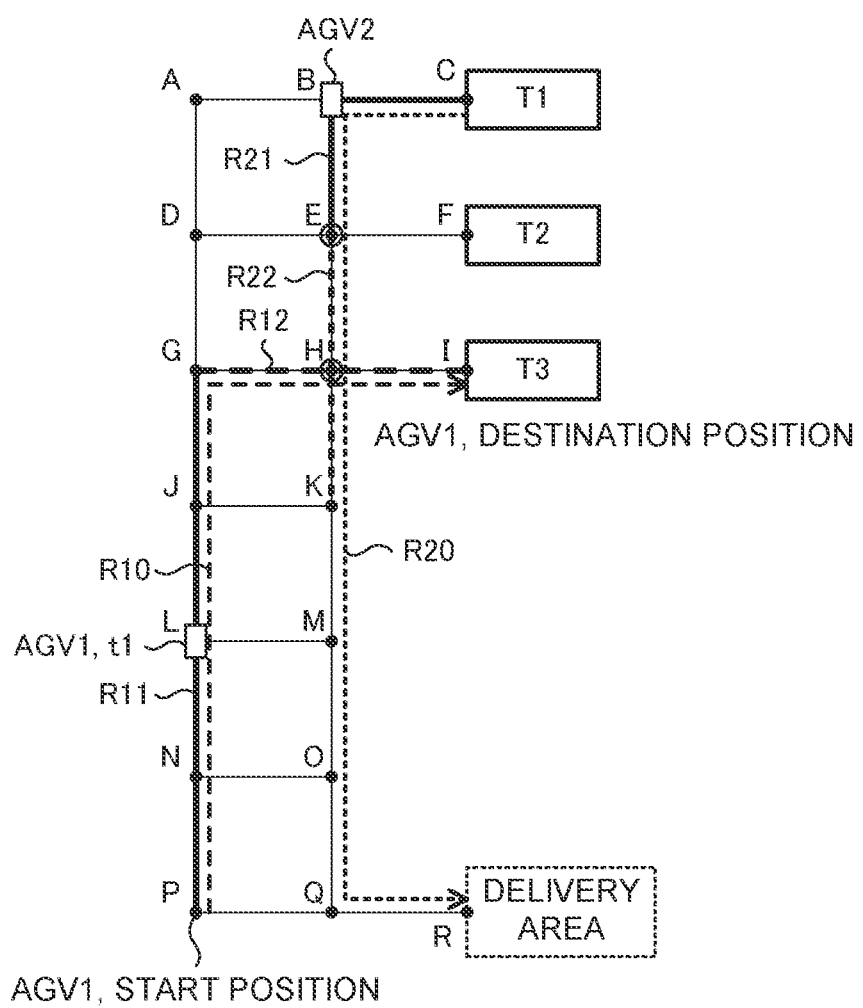
FIG. 14 is a diagram illustrating an example of the setting method of the travel route in the conveyance system according to the embodiment of the present disclosure.

For example, as shown in FIG. 14, the controller 11 provisionally sets a next reserved travel route at timing (t1) before the AGV1 arrives at the point G, which is the end point of the section travel route R11. Here, since the specific intersection H exists within four sections (determined length) from the point G, the section travel-route length determiner 113 sets the section travel-route length to "2" (the second length), and the reserved travel-route setter 115 provisionally sets the section travel route R12 of the points G→H→I corresponding to the AGV1 to the reserved travel route. Similarly, the reserved travel-route setter 115 provisionally sets a section travel route R22 of the points E→H→K corresponding to the AGV2 to the reserved travel route.

The intersection determiner 119 determines whether the AGV1 intersects the AGV2 or not. When the AGV1 intersects the AGV2, the controller 11 executes the following avoiding method. Moreover, when the AGV1 does not intersect the AGV2, the output processor 117 sets the provisionally set reserved travel route as an officially reserved travel route and outputs the travel route information and the control information to the AGV1. In the example shown in FIG. 14, since the section travel route R12 of the AGV1 intersects the section travel route R22 of the AGV2, the controller 11 executes the following avoiding method.

Specifically, when the intersection determiner 119 determines that the AGV1 intersects the AGV2 on the entire travel route R10, the avoidance information creator 120 creates a plurality of avoidance information candidates for avoiding the intersection of the AGV1 and the AGV2. The plurality of avoidance information candidates include avoidance information candidates by a plurality of different avoiding methods. The avoidance information creator 120 creates a plurality of different avoiding methods (first to third avoiding methods).

First Avoiding Method

Figure 15:
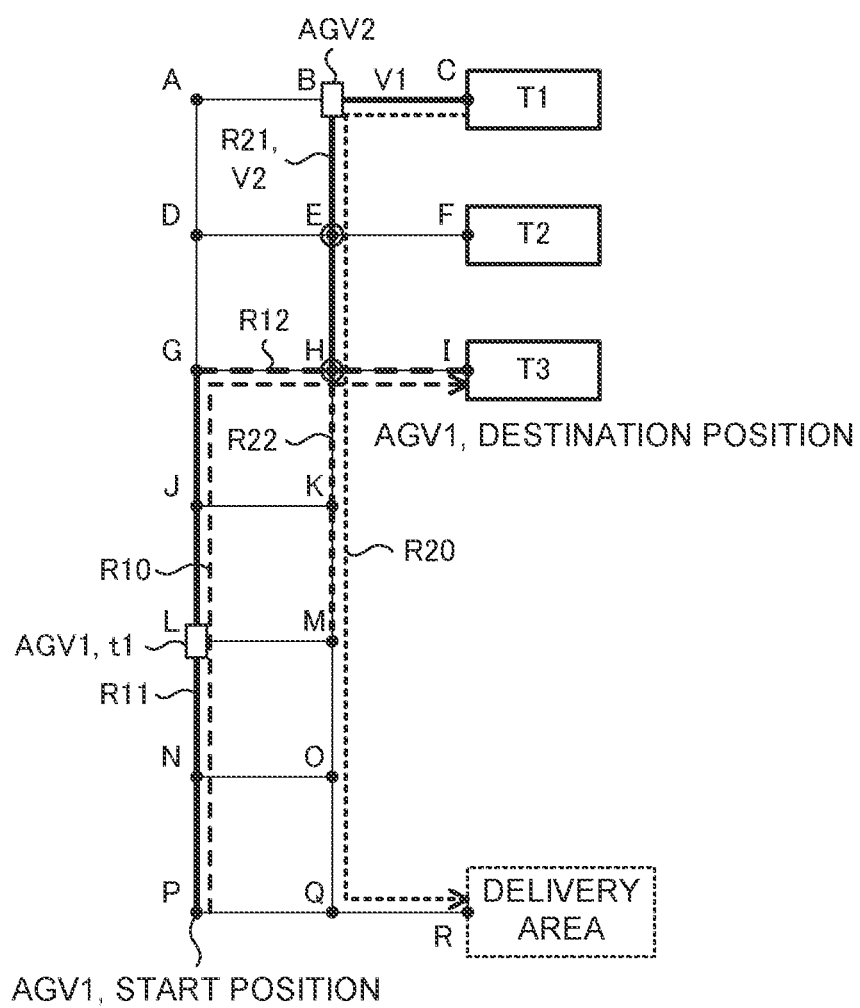
FIG. 15 is a diagram illustrating an example of the setting method of the travel route in the conveyance system according to the embodiment of the present disclosure.

The first avoiding method is a method for avoiding intersection by changing the control information set by the control information setter 116. Specifically, the control information includes information on the traveling speed of the automatic conveying device 3 at each point on the travel route, and the intersection is avoided by changing the traveling speed of the automatic conveying device 3 at each point on the travel route. For example, as shown in FIG. 15, the avoidance information creator 120 changes the traveling speed of the AGV2 from the point B to the point H to a speed V2, which is twice a traveling speed V1 from the point C to the point B. Note that the traveling speed of the AGV1 is set to the speed V1. Moreover, the avoidance information creator 120 may change the traveling speed V1 of the AGV1.

Second Avoiding Method

Figure 16:
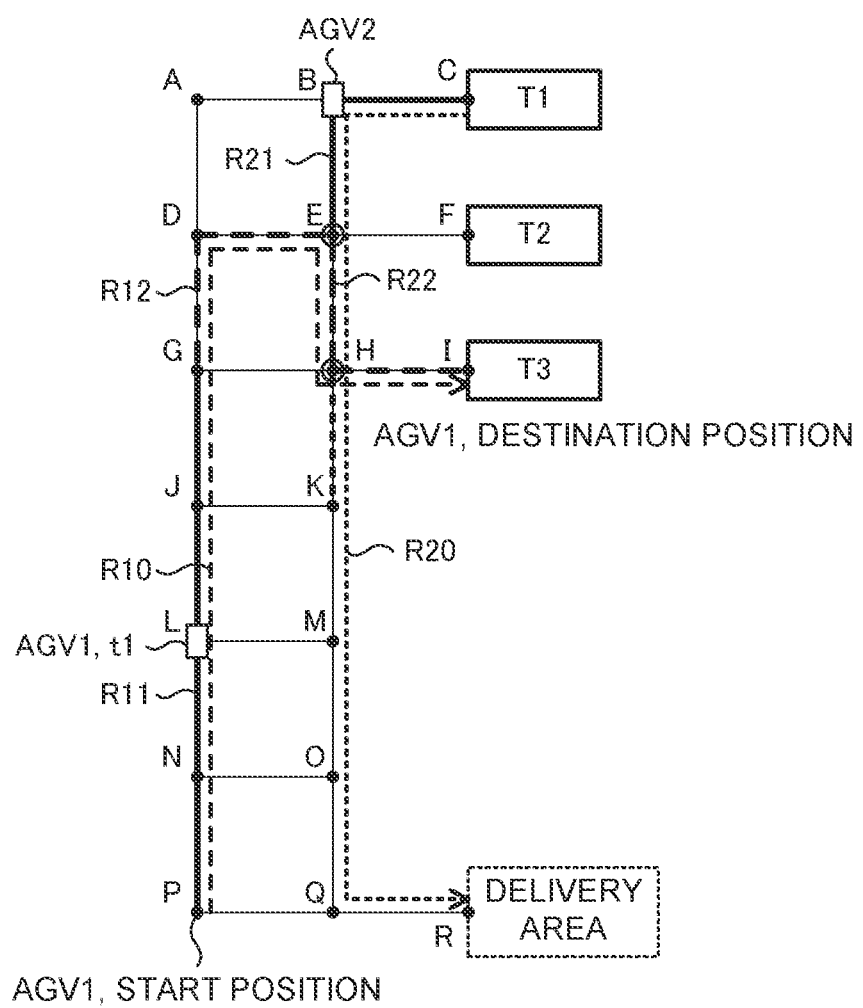
FIG. 16 is a diagram illustrating an example of the setting method of the travel route in the conveyance system according to the embodiment of the present disclosure.

The second avoiding method is a method for avoiding intersection by changing the entire travel route set by the entire travel-route setter 112. For example, as shown in FIG. 16, the avoidance information creator 120 changes the section travel route R12 of the points G→H→I provisionally set for the AGV1 to the section travel route R12 of the points G→D→E→H→I. Note that the avoidance information creator 120 may change the section travel route R22 of the points E→H→K provisionally set for the AGV2.

Third Avoiding Method

Figure 17:
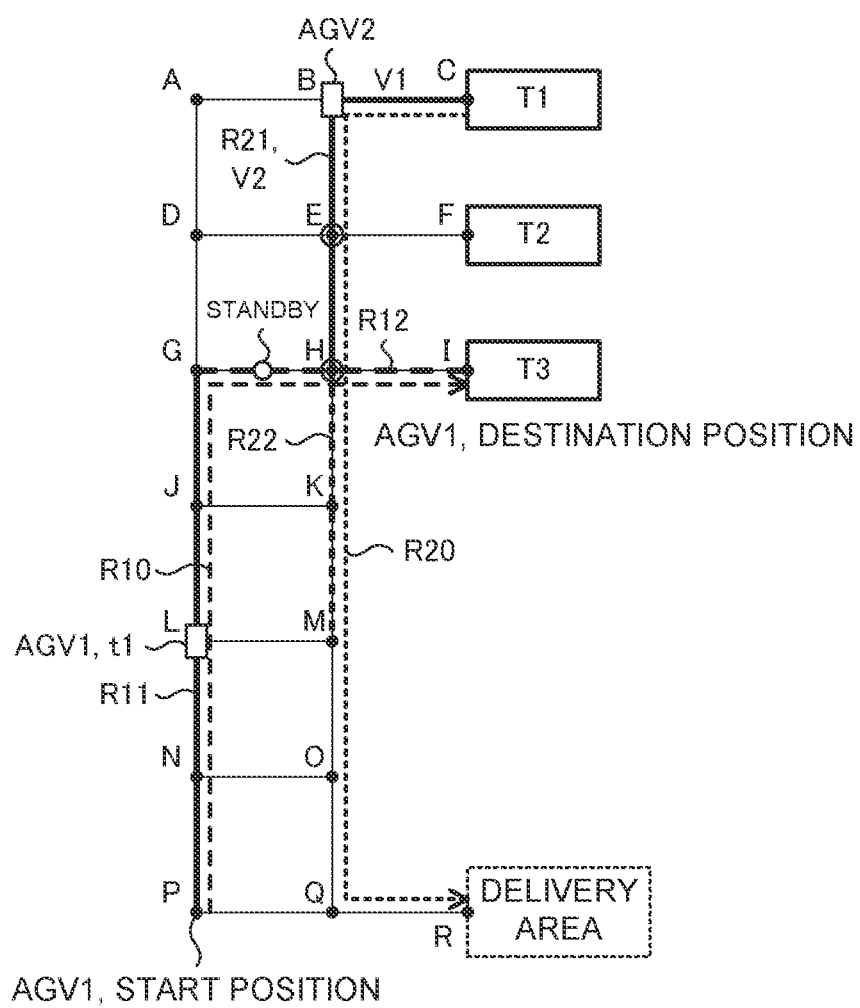
FIG. 17 is a diagram illustrating an example of the setting method of the travel route in the conveyance system according to the embodiment of the present disclosure.

The third avoiding method is a method of causing the control information set by the control information setter 116 to stop the automatic conveying device 3 at a predetermined position of the travel route. For example, as shown in FIG. 17, the avoidance information creator 120 sets the control information to stop the AGV1 for a predetermined period of time (1 second, for example) before the intersection H. Note that the avoidance information creator 120 may set the control information to stop the AGV2 for a predetermined period of time (1 second, for example) before the intersection H.

As described above, the avoidance information creator 120 creates a plurality of different avoiding methods (avoidance information candidates). By having the automatic conveying device 3 perform traveling in the avoiding method, intersection of the AGV1 and the AGV2 at the intersection H can be avoided.

The appropriateness evaluator 121 evaluates appropriateness of each of the plurality of avoidance information candidates created by the avoidance information creator 120 by the operation simulations of all the automatic conveying devices 3. Specifically, the appropriateness evaluator 121 determines success or not of the avoidance of intersection for each of the plurality of avoidance information candidates created by the avoidance information creator 120 by the operation simulations of all the automatic conveying devices 3.

For example, the appropriateness evaluator 121 determines (evaluates) the total conveyance time of all the automatic conveying devices 3 for each of the plurality of avoidance information candidates created by the avoidance information creator 120 by the operation simulations of all the automatic conveying devices 3.

The avoidance information determiner 122 determines one avoidance information candidate from among the plurality of avoidance information candidates as the avoidance information on the basis of an evaluation result (total conveyance time) of the appropriateness evaluator 121. For example, the avoidance information determiner 122 determines the avoidance information candidate whose total conveyance time of all automatic conveying devices 3 is the shortest as the avoidance information.

In addition, each of the plurality of different avoiding methods has a priority set, and the avoidance information determiner 122 may determine one avoidance information candidate from among the plurality of avoidance information candidates as the avoidance information on the basis of the evaluation result of the appropriateness evaluator 121 and the priority set for each of the plurality of different avoiding methods.

Moreover, the avoidance information determiner 122 may extract the avoidance information candidates whose evaluation results satisfy a predetermined standard and which have the highest priorities among the plurality of avoidance information candidates as secondary candidates and may further determine one avoidance information candidate among the avoidance information candidates extracted as the secondary candidates as the avoidance information on the basis of the evaluation results of the appropriateness evaluator 121.

When the avoidance information determiner 122 determines the avoidance information, the output processor 117 outputs the travel route information and the control information concerning the reserved travel route corresponding to the avoidance information to the automatic conveying device 3. Upon obtaining the travel route information and the control information, each of the AGV1 and the AGV2 starts traveling on the set reserved travel route. The controller 11 sequentially sets the travel route information and the control information corresponding to the reserved travel route and continues the traveling of each automatic conveying device 3.

Conveyance Processing

Figure 18:
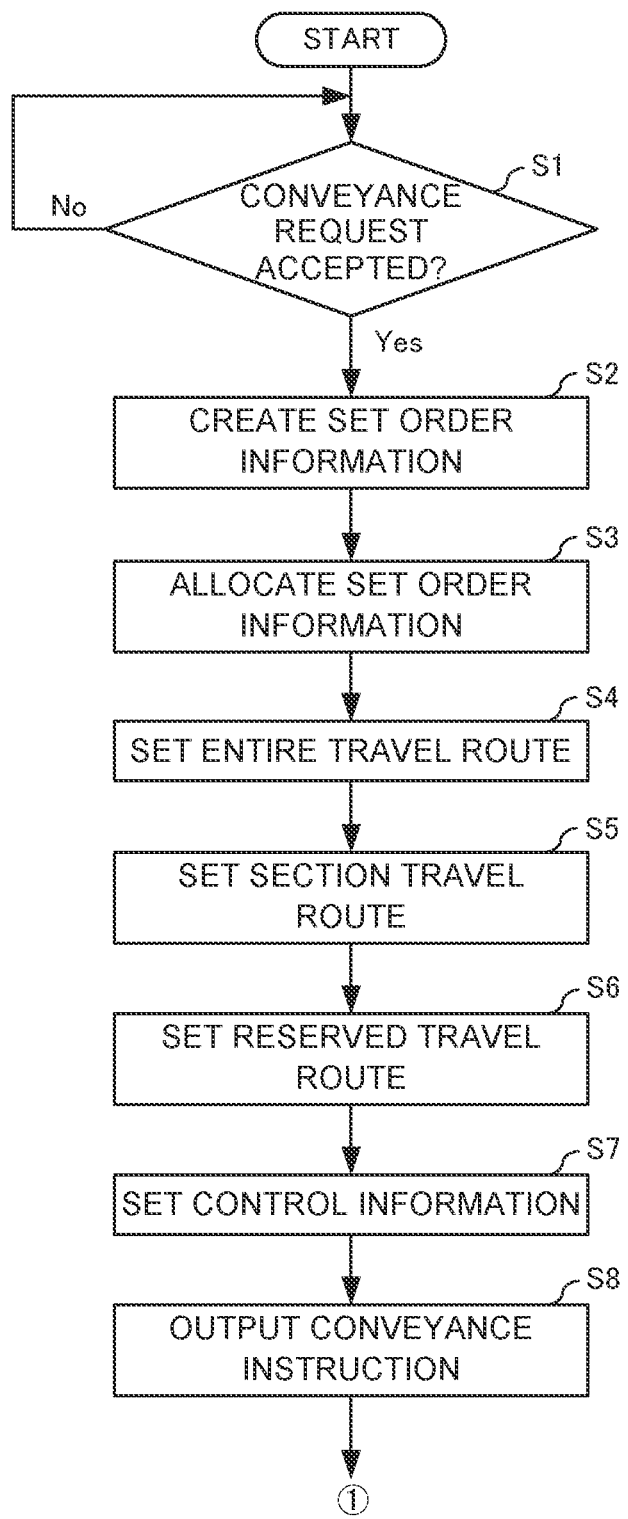
FIG. 18 is a flowchart illustrating an example of a conveyance processing procedure performed by the conveyance system according to the embodiment of the present disclosure.
Figure 19:
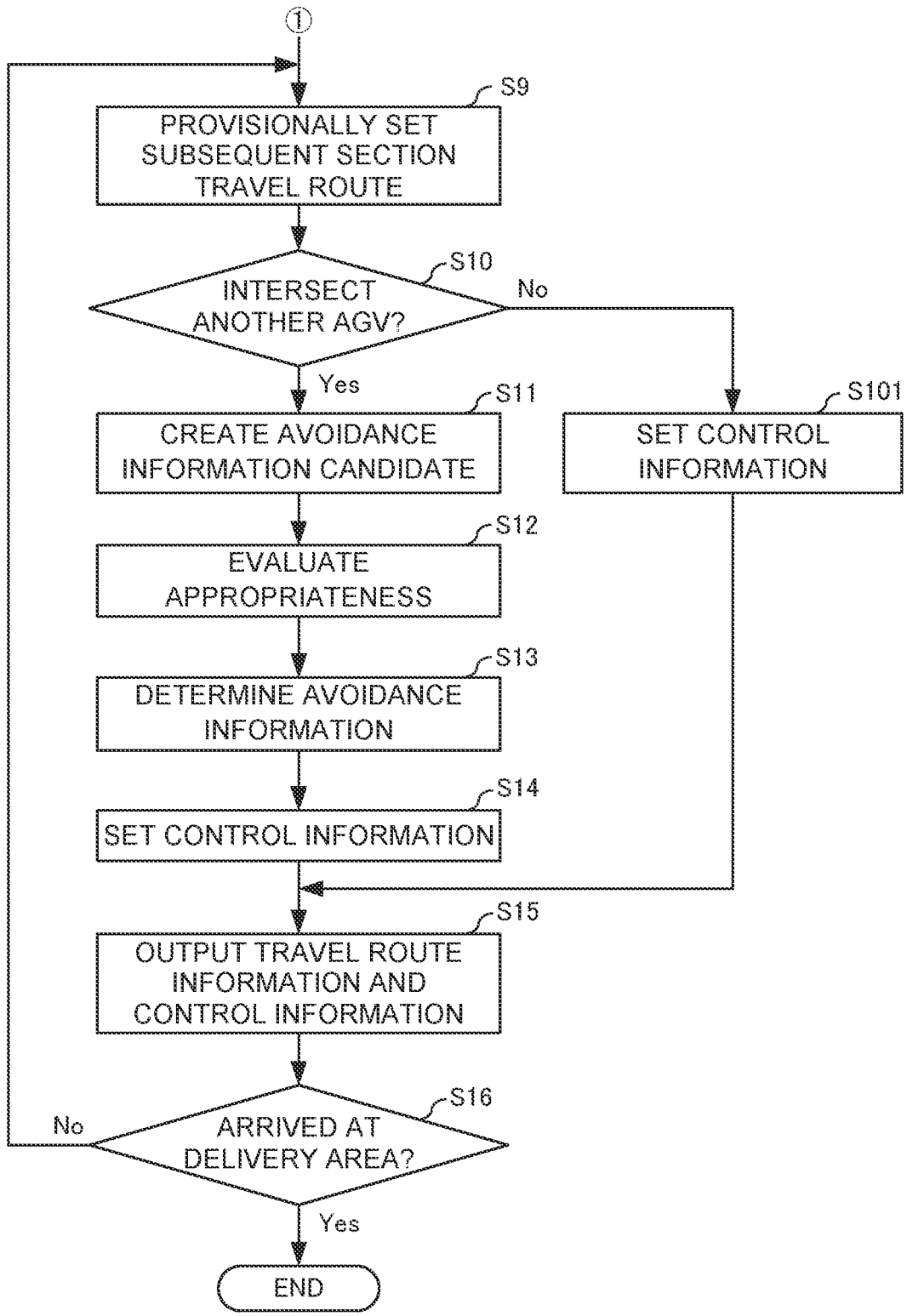
FIG. 19 is a flowchart illustrating an example of the conveyance processing procedure performed by the conveyance system according to the embodiment of the present disclosure.

Hereinafter, conveyance processing executed by the conveyance system 10 will be described with reference to FIG. 18 and FIG. 19. Specifically, in this embodiment, the conveyance processing is executed by the controller 11 of the operation management server 1. Moreover, the controller 11 can execute a plurality of conveyance processing at the same time in response to a plurality of conveyance requests output from the order management server 2.

Note that the present disclosure can be considered as a disclosure of a conveying method for executing one or a plurality of steps included in the conveyance processing. Moreover, one or a plurality of steps included in the conveyance processing described herein may be omitted where appropriate. In addition, each step in the conveyance processing may be executed in a different order as long as similar operations and effects are obtained. Furthermore, although a case where the controller 11 executes each step in the conveyance processing is described herein as an example, a conveying method in which one or a plurality of processors execute each step of the conveyance processing in a distributed manner is also considered as another embodiment.

First, at Step S1, the controller 11 determines whether a conveyance request has been accepted from the order management server 2 or not. Specifically, the controller 11 determines whether the order information D2 (see FIG. 5) has been accepted from the order management server 2 or not. When the controller 11 has accepted the order information D2, the processing proceeds to Step S2.

At Step S2, the controller 11 creates the set order information D3 (see FIG. 6). Specifically, the controller 11 generates the set order information D3 on the basis of the order information D2 (see FIG. 5) and the item information D1 (see FIG. 4).

Subsequently, at Step S3, the controller 11 assigns the set order information D3 to one automatic conveying device 3. Specifically, the controller 11 obtains information such as the current position, the traveling speed, the advancing direction, the travel status (traveling or waiting) and the like of all the automatic conveying devices 3 on a real time basis and, on the basis of each information, specifies one automatic conveying device 3 and assigns the set order information D3. Here, the controller 11 assigns the set order information D3 of "SET1" to the AGV1.

Subsequently, at Step S4, the controller 11 sets the entire travel route, which is an initial travel route of the AGV1.

First, the controller 11 sets the travel start position P and the destination position I for the automatic conveying device 3 (see FIG. 8). Subsequently, the controller 11 prohibits the entry of the AGV1 into the section of the aisles of the points C→B→E from time t0 to t2 on the basis of the reserved travel route (aisles of the points C→B→E) set for another AGV2. Subsequently, the controller 11 performs the operation simulations for all the automatic conveying devices 3 at the same time, and while prohibiting the entry of the AGV1 into the section of the aisles of the points C→B→E from the time t0 to t2, sets the entire travel route for the AGV1 to move from the point P to the point I so that the total of the conveyance time of all the AGVs becomes the shortest. Here, as shown in FIG. 10, the controller 11 sets the aisles of the points P→N→L→J→G→H→I as the entire travel route R10 for the AGV1.

Subsequently, at Step S5, the controller 11 sets a section travel route. Specifically, the controller 11 determines the length of the section travel route by any one method of the aforementioned first to fifth determining methods and sets the section travel route with the determined section travel-route length. In the example shown in FIG. 11, the controller 11 sets a route (aisles of the points P→N→L→J→G) with the length from the current position P to the point G four sections ahead (the section travel-route length "4") as the section travel route R11 in the entire travel route R10 corresponding to the AGV1. In addition, the controller 11 sets the route (aisles of the points C→B→E) with the length from the current position C to the point E two sections ahead (the section travel route length "2") as the section travel route R21 in the entire travel route R20 corresponding to the AGV2.

Subsequently, at Step S6, the controller 11 sets the set section travel route as the reserved travel route. In the example shown in FIG. 11, the controller 11 sets the section travel route R11 of the points P→N→L→J→G corresponding to the AGV1 as the reserved travel route and sets the section travel route R21 of the points C→B→E corresponding to the AGV2 as the reserved travel route.

Subsequently, at Step S7, the controller 11 sets the control information that defines the operation of the automatic conveying device 3 in association with the markers on the section travel route. For example, the controller 11 sets the high-speed control information for the reserved travel route of the section travel route R11 corresponding to the AGV1 and sets the low-speed control information for the reserved travel route of the section travel route R21 corresponding to the AGV2.

Subsequently, at Step S8, the controller 11 outputs the travel route information including the entire travel route and the section travel route and the control information to the automatic conveying device 3. For example, controller 11 outputs the travel route information and the control information to each of the AGV1 and the AGV2.

Upon obtaining the travel route information and the control information, each of the AGV1 and the AGV2 starts traveling on the reserved travel route.

When the automatic conveying device 3 starts traveling on the reserved travel route, at Step S9 (see FIG. 19), the controller 11 provisionally sets the section travel route for the automatic conveying device 3 to travel next while the automatic conveying device 3 is traveling. For example, the controller 11 provisionally sets the section travel route R12 of the points G→H→I corresponding to the AGV1 as the reserved travel route and provisionally sets the section travel route R22 of the points E→H→K corresponding to the AGV2 as the reserved travel route.

Subsequently, at Step S10, the controller 11 determines whether the AGV1 intersects the AGV2 on the reserved travel route or not. Specifically, the controller 11 determines whether the AGV1 intersects the AGV2 or not. If the AGV1 intersects the AGV2 (S10: Yes), the processing proceeds to Step S11. If the AGV1 does not intersect the AGV2 (S10: No), the processing proceeds to Step S101.

At Step S101, the controller 11 outputs the travel route information and the control information corresponding to the provisionally set reserved travel route to the AGV1. After Step S101, the processing proceeds to Step S15.

At Step S11, the controller 11 creates a plurality of avoidance information candidates to avoid intersection of the AGV1 and the AGV2. For example, the controller 11 creates the avoidance information candidates by the first avoiding method (see FIG. 15), the avoidance information candidates by the second avoiding method (see FIG. 16), and the avoidance information candidates by the third avoiding method (see FIG. 17).

Subsequently, at Step S12, the controller 11 performs evaluation of the appropriateness of each of the plurality of avoidance information candidates created by the operation simulation of all the automatic conveying devices 3. For example, the controller 11 determines (evaluates) the total of the conveyance time of all the automatic conveying devices 3 for each of the plurality of avoidance information candidates created by the operation simulation of all the automatic conveying devices 3.

Subsequently, at Step S13, the controller 11 determines the one avoidance information candidate from among the plurality of avoidance information candidates as avoidance information on the basis of the evaluation result (total conveyance time). Specifically, the controller 11 determines one avoidance information candidate from among the plurality of avoidance information candidates as avoidance information on the basis of the evaluation result (total conveyance time) and the priorities set for each of the plurality of avoiding methods.

Subsequently, at Step S14, the controller 11 sets the control information corresponding to the determined avoidance information.

Subsequently, at Step S15, the controller 11 outputs the travel route information and the control information concerning the reserved travel route corresponding to the avoidance information to the automatic conveying device 3. Upon obtaining the travel route information and the control information, each of the AGV1 and the AGV2 starts traveling on the next reserved travel route.

Subsequently, at Step S16, the controller 11 determines whether the automatic conveying device 3 has arrived at the delivery area or not. When the automatic conveying device 3 arrives at the delivery area (S16: Yes), the controller 11 ends the conveyance processing. The controller 11 repeats the processing from Steps S9 to S15 until the automatic conveying device 3 arrives at the delivery area (S16: No).

As explained above, the conveyance system 10 according to this embodiment accepts a conveyance request for a conveyance target and on the basis of the accepted conveyance request, sets a section travel route with the predetermined length (variable length) constituting a part of the travel route from a current position to a destination position of a first automatic conveying device so that the section travel route of the first automatic conveying device does not overlap the section travel route set for a second automatic conveying device, which is another automatic conveying device. In addition, the conveyance system 10 repeatedly executes the processing of setting a subsequent section travel route while the automatic conveying device is traveling on the section travel route, using the end position of the section travel route as the start position of the subsequent section travel route.

For example, if the entire travel route is a route in the order of the points "1→2→3→4→5→6→7→8→9", and the first section travel route is "1→2→3→4", the second section travel route is "4→5→6→7", and the third section travel route is "7→8→9", the conveyance system 10 sets the second section travel route at the point "3" continuing to the end position "4" of the first section travel route. Note that, since the start position of the second section travel route is the same as the end position of the first section travel route, the conveyance system 10 does not add the point "4" but automatically adds the route "5→6→7". The conveyance system 10 repeatedly executes this processing.

For example, the conveyance system 10 sets the second section travel route "4→5→6→7", when the AGV arrives at the point "3" of the first section travel route "1→2→3→4", while the AGV adds "5→6→7" in internal processing. Subsequently, the conveyance system 10 sets the third section travel route "7→8→9", when the AGV arrives at the point "6" of the second section travel route "4→5→6→7", while the AGV adds "8→9" in the internal processing. Moreover, by dynamically adjusting (prolonging or shortening) the length of this section travel route to be added in accordance with the situation in the simulation, stable travel control can be realized even with a large number of units.

Moreover, the conveyance system 10 according to this embodiment accepts a conveyance request for a conveyance target and sets the entire travel route from the current position of the first automatic conveying device to the storage position on the basis of the accepted conveyance request. In addition, the conveyance system 10 determines the length of the section travel route on the basis of the information on the portion within the determined length set in advance from the section start position in the entire travel route and sets the section travel route with the section travel-route length from the section start position on the entire travel route. Moreover, the conveyance system 10 sets the section travel route as a reserved travel route.

According to the above configuration, a reserved travel route with a longer distance and a reserved travel route with a shorter distance can be set on the basis of the entire travel route. In this way, since the length of the reserved travel route can be adjusted for each portion in the entire travel route, a loss of conveyance time in the entire course on which the automatic conveying device travels can be reduced.

Moreover, the conveyance system 10 according to this embodiment accepts a conveyance request for a conveyance target and sets the entire travel route from the current position of the first automatic conveying device to the storage position on the basis of the accepted conveyance request. In addition, the conveyance system 10 sets the control information that defines the operation when the automatic conveying device travels on the entire travel route. Moreover, the conveyance system 10 determines whether the first automatic conveying device intersects the second automatic conveying device on the entire travel route or not, and when it determines that the first automatic conveying device intersects the second automatic conveying device on the entire travel route, it creates a plurality of avoidance information candidates to avoid intersection of the first automatic conveying device and the second automatic conveying device. In addition, the conveyance system 10 performs the appropriateness evaluation of each of the plurality of avoidance information candidates thus created by operation simulations of all the automatic conveying devices, and on the basis of the evaluation results, it determines one avoidance information candidate from among the plurality of avoidance information candidates.

According to the above configuration, the entire travel route from the travel start position to the destination position is first assigned to a plurality of the automatic conveying devices 3 and causes each of the automatic conveying devices 3 to start traveling. Then, in the middle of the traveling of the automatic conveying device 3, occurrence of intersection in the near future is predicted at any time. Note that the conveyance system 10 may use real-time position information, travel status and the like of all the AGVs to predict presence/absence of occurrence of intersection between the AGVs. When occurrence of intersection is predicted, a plurality of avoidance information candidates are created, and an operation simulation is performed for all the automatic conveying devices 3 for each of the plurality of avoidance information candidates, and the reserved travel route with the shortest conveyance time is re-set. As a result, the occurrence of intersection can be predicted with accuracy even when a distance to the destination position is large. Moreover, when occurrence of intersection is predicted, by performing operation simulations of all the automatic conveying devices 3 and re-setting the reserved travel route with the shortest conveyance time, a loss of the conveyance time for the plurality of automatic conveying devices as a whole can be reduced.

As described above, the conveyance system 10 does not set a batch route (entire travel route) in response to a conveyance request, but rather predicts presence/absence of intersection and dynamically generates a non-overlapping traveling route by using the travel status of the AGV as a whole in real time on the basis of the section travel route. In addition, the conveyance system 10 dynamically sets a section travel route with a variable length and creates and instructs a high-speed and efficient section travel route so that stop time caused by intersection can be minimized as a whole and the conveyance in the shortest time can be realized.

Specifically, the conveyance system 10 divides and sets a plurality of section travel routes and instructs the AGV to travel on each of them at appropriate timing. In addition, the conveyance system 10 uses the travel status of the AGV as a whole in real time, on the basis of the shortest route, to predict presence/absence of intersection and dynamically generates a non-overlapping travel route. At occurrence of intersection, the conveyance system 10 selects the appropriate method of detouring, adjusting speed, or waiting for a stop by simulation.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A conveyance system that receives a signal including order information received from at least one terminal and stores the order information in a storage device, the conveyance system configured to set a travel route for an automated guided vehicle (AGV) so as to move the AGV to a destination position to carry at least one item, included in the order information, from a first position to the destination position, the conveyance system comprising:
at least one controller configured to:
receive, from a server, a movement request to move the AGV
set a section travel route to form a part of the travel route from a current position of the AGV to the destination position based on the received movement request such that the section travel route of the AGV does not overlap another section travel route set for another AGV,
determine a length of the section travel route based on information on a portion within a determined length set in advance from a start position of the section travel route, and
transmit an operation signal to the AGV and the other AGV, wherein the section travel route includes a first section travel route and a second section travel route, the at least one controller is further configured to repeatedly execute setting the second section travel route with an end position of the first section travel route as a start position of the second section travel route while the AGV is traveling on the first section travel route, and
the length of the section travel route is determined based on one or more of:
(i) whether or not a position of a specific intersection with a high possibility of a collision of a plurality of AGVs, including the AGV and the other AGV, among a plurality of intersections where a plurality of aisles intersect each other, exists within the determined length from the start position of the section travel route,
(ii) whether or not a low-speed travel aisle, on which the AGV travels at a low speed, exists within the determined length from the start position of the section travel route
(iii) whether or not the portion within the determined length from the start position of the section travel route is included in a low-speed travel area in which the AGV travels at a low speed,
(iv) whether or not a right/left turn point exists within the determined length from the start position of the section travel route,
(v) or whether or not the portion within the determined length from the start position of the section travel route is included in a high-density area with a probability of occurrence of the collision of the plurality of AGVs being higher than a threshold value.

2. The conveyance system according to claim 1, wherein the at least one controller is further configured to:
set the section travel route as a reserved travel route.

3. The conveyance system according to claim 1, wherein the position of the specific intersection with the high possibility of the collision of the plurality of AGVs, among the plurality of intersections where the plurality of aisles intersect each other, is registered in advance, and
the at least one controller is further configured to:
set a first length as the length of the section travel route when the specific intersection does not exist within the determined length from the start position of the section travel route, and
set a second length, which is shorter than the first length, as the length of the section travel route when the specific intersection exists within the determined length from the start position of the section travel route.

4. The conveyance system according to claim 1, wherein a high-speed travel aisle, on which the AGV travels at a high speed, and the low-speed travel aisle, on which the AGV travels at the low speed, are registered in advance, and the at least one controller is further configured to:
　set a first length as the length of the section travel route when the low-speed travel aisle is not included within the determined length from the start position of the section travel route, and
　set a second length, which is shorter than the first length, as the length of the section travel route when the low-speed travel aisle is included within the determined length from the start position of the section travel route.

5. The conveyance system according claim 1, wherein
a high-speed travel area, in which the AGV travels at a high speed, and the low-speed travel area, in which the AGV travels at the low speed, are registered in advance, and
the at least one controller is further configured to:
　set a first length as the length of the section travel route when the portion within the determined length from the start position of the section travel route is not included in the low-speed travel area, and
　set a second length, which is shorter than the first length, as the length of the section travel route when the portion within the determined length from the start position of the section travel route is included in the low-speed travel area.

6. The conveyance system according claim 1, wherein the at least one controller is further configured to:
　set a first length as the length of the section travel route when the right/left turn point does not exist within the determined length from the start position of the section travel route, and
　set a second length, which is shorter than the first length, as the length of the section travel route when the right/left turn point exists within the determined length from the start position of the section travel route.

7. The conveyance system according claim 1, wherein the at least one controller is further configured to:
　determine the high-density area with the probability of occurrence of the collision of the plurality of AGVs being higher than the threshold value based on current positions of the plurality of AGVs,
　set a first length as the length of the section travel route when the portion within the determined length from the start position of the section travel route is not included in the high density area, and
　set a second length, which is shorter than the first length, as the length of the section travel route when the portion within the determined length from the start position of the section travel route is included in the high-density area.

8. The conveyance system according to claim 1, wherein the at least one controller is further configured to:
　set control information which defines an operation of the AGV in association with a marker on the section travel route of the AGV, and
　output, to the AGV, travel route information, which includes the travel route and the section travel route, and the control information.

9. The conveyance system according to claim 8, wherein the at least one controller is further configured to:
　set information of a first speed in association with the marker on the section travel route of the AGV when the length of the section travel route is greater than or equal to a predetermined reference length, and
　set information of a second speed, which is smaller than the first speed, when the length of the section travel route is less than the predetermined reference length.

10. The conveyance system according to claim 1, wherein the at least one controller is further configured to:
　set control information that defines an operation when the AGV travels on the travel route,
　determine whether the AGV collides the other AGV on the travel route or not,
　create a plurality of avoidance information candidates to avoid of a collision between the AGV and the other AGV when the AGV is determined to collide with the other AGV on the travel route,
　evaluate appropriateness of each of the plurality of avoidance information candidates using an operation simulation of the plurality of AGVs, and
　determine one avoidance information candidate, among the plurality of avoidance information candidates, as avoidance information based on an appropriateness evaluation result.

11. The conveyance system according to claim 10, wherein
the at least one controller is further configured to determine success/failure of avoidance of the collision for each of the plurality of avoidance information candidates using the operation simulation of the plurality of AGVs.

12. The conveyance system according to claim 10, wherein
the at least one controller is further configured to determine a total of conveyance time of the plurality of AGVs for each of the plurality of avoidance information candidates using the operation simulation of the plurality of AGVs.

13. The conveyance system according to claim 10, wherein
the plurality of avoidance information candidates includes avoidance information candidates using a plurality of different avoiding methods.

14. The conveyance system according to claim 13, wherein
the plurality of different avoiding methods includes a method for avoiding the collision by changing control information set by the at least one controller.

15. The conveyance system according to claim 14, wherein
the control information includes a traveling speed of the AGV at each point on the travel route, and
the method is a method for avoiding the collision by changing the traveling speed of the other AGV at at least one particular point on the travel route before a possible collision point.

16. The conveyance system according to claim 13, wherein
the plurality of different avoiding methods includes a method for avoiding the collision by changing the travel route.

17. The conveyance system according to claim 13, wherein
the plurality of different avoiding methods includes a method of causing control information set by the at least one controller to stop the other AGV at a predetermined position on the travel route.

18. The conveyance system according to claim 13, wherein
each of the plurality of different avoiding methods has a set priority, and
the at least one controller is further configured to determine the one avoidance information candidate, among the plurality of avoidance information candidates, as the avoidance information based on the appropriateness evaluation result and the set priority for each of the plurality of different avoiding methods.

19. A conveying method in which one or more processors receive a signal including order information received from at least one terminal and store the order information in a storage device, the one or more processors configured to set a travel route for an automated guided vehicle (AGV) so as to move the AGV to a destination position to carry at least one item, included in the order information, from a first position to the destination position, the conveying method comprising:

receiving, from a server, a movement request to move the AGV;

based on the movement request, setting a section travel route to form a part of the travel route from a current position of the AGV to the destination position such that the section travel route of the AGV does not overlap another section travel route set for another AGV, wherein the section travel route includes a first section travel route and a second section travel route;

determining a length of the section travel route based on information on a portion within a determined length set in advance from a start position of the section travel route;

repeatedly executing processings of setting the second section travel route with an end position of the first section travel route as a start position of the second section travel route while the AGV is traveling on the first section travel route and transmitting an operation signal to the AGV and the other AGV, wherein the length of the section travel route is determined based on one or more of:
  (i) whether or not a position of a specific intersection with a high possibility of a collision of a plurality of the AGVs, including the AGV and the other AGV, among a plurality of intersections where a plurality of aisles intersect each other, exists within the determined length from the start position of the section travel route,
  (ii) whether or not a low-speed travel aisle, on which the AGV travels at a low speed, exists within the determined length from the start position of the section travel route,
  (iii) whether or not the portion within the determined length from the start position of the section travel route is included in a low-speed travel area in which the AGV travels at a low speed,
  (iv) whether or not a right/left turn point exists within the determined length from the start position of the section travel route, or
  (v) whether or not the portion within the determined length from the start position of the section travel route is included in a high-density area with a probability of occurrence of the collision of the plurality of AGVs being higher than a threshold value.

* * * * *